US009055306B2

(12) United States Patent (10) Patent No.: US 9,055,306 B2
Lyashevsky et al. (45) Date of Patent: *Jun. 9, 2015

(54) PARALLEL DECODING METHOD AND SYSTEM FOR HIGHLY COMPRESSED DATA

(75) Inventors: Alexander Lyashevsky, Cupertino, CA (US); Jason Yang, San Francisco, CA (US); Arcot J. Preetham, Sunnyvale, CA (US)

(73) Assignee: ATI Technologies ULC, Markham, Ontario (CA)

( * ) Notice: Subject to any disclaimer, the term of this patent is extended or adjusted under 35 U.S.C. 154(b) by 1741 days.

This patent is subject to a terminal disclaimer.

(21) Appl. No.: 11/514,780

(22) Filed: Aug. 31, 2006

(65) Prior Publication Data

US 2008/0056348 A1 Mar. 6, 2008

(51) Int. Cl.
*H04N 7/12* (2006.01)
*H04N 19/85* (2014.01)
*H04N 19/61* (2014.01)
*H04N 19/44* (2014.01)
*H04N 19/436* (2014.01)

(52) U.S. Cl.
CPC .............. *H04N 19/85* (2014.11); *H04N 19/61* (2014.11); *H04N 19/44* (2014.11); *H04N 19/436* (2014.11)

(58) Field of Classification Search
CPC ...................................................... H04N 19/85
USPC ................. 704/500–504; 375/130–153, 375/240.01–240.29
IPC ...... G10L 19/00,21/04; H04B 1/66; H04N 7/12, H04N 7/26, 11/02, 11/04
See application file for complete search history.

(56) References Cited

U.S. PATENT DOCUMENTS

| | | | |
|---|---|---|---|
| 6,408,382 B1 * | 6/2002 | Pechanek et al. ............. | 712/227 |
| 7,181,070 B2 * | 2/2007 | Petrescu et al. .............. | 382/236 |
| 2003/0121053 A1 * | 6/2003 | Honda .......................... | 725/107 |
| 2003/0201994 A1 * | 10/2003 | Taylor et al. .................. | 345/581 |
| 2004/0258162 A1 * | 12/2004 | Gordon et al. ........... | 375/240.25 |
| 2005/0259688 A1 * | 11/2005 | Gordon ......................... | 370/477 |
| 2007/0195099 A1 * | 8/2007 | Diard et al. ................... | 345/501 |
| 2007/0223593 A1 * | 9/2007 | Wilding .................... | 375/240.26 |
| 2010/0135414 A1 * | 6/2010 | Valente .................... | 375/240.24 |

* cited by examiner

*Primary Examiner* — Richard Torrente
(74) *Attorney, Agent, or Firm* — Volpe and Koenig, P.C.

(57) ABSTRACT

Embodiments of a method and system for decoding video data are described herein. In various embodiments, a high-compression-ratio codec (such as H.264) is part of the encoding scheme for the video data. Embodiments pre-process control maps that were generated from encoded video data, and generating intermediate control maps comprising information regarding decoding the video data. The control maps include information regarding rearranging the video data to be processed in parallel on multiple pipelines of a graphics processing unit (GPU) so as to optimize the use of the multiple pipelines. In an embodiment, decoding is performed on a frame basis such that each of multiple, distinct decoding operations is performed on an entire frame at one time. In other embodiments, processing of different frames is interleaved. Embodiments increase the efficiency of the decoding such as to allow decoding of high-compression-ratio encoded video data on personal computers or comparable equipment without special, additional decoding hardware.

31 Claims, 23 Drawing Sheets

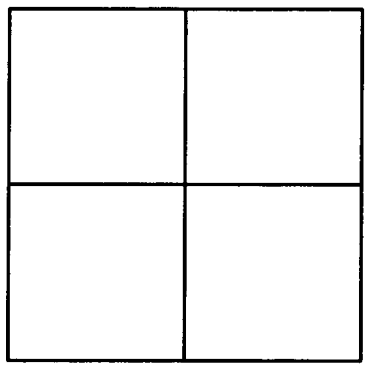
4 x 4
FIG.6C
8 x 8
FIG.6B
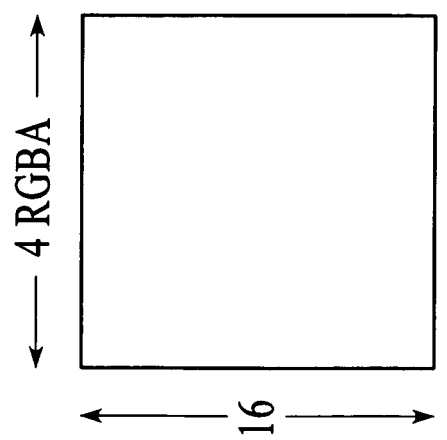
16 x 16 Pels
FIG.6A

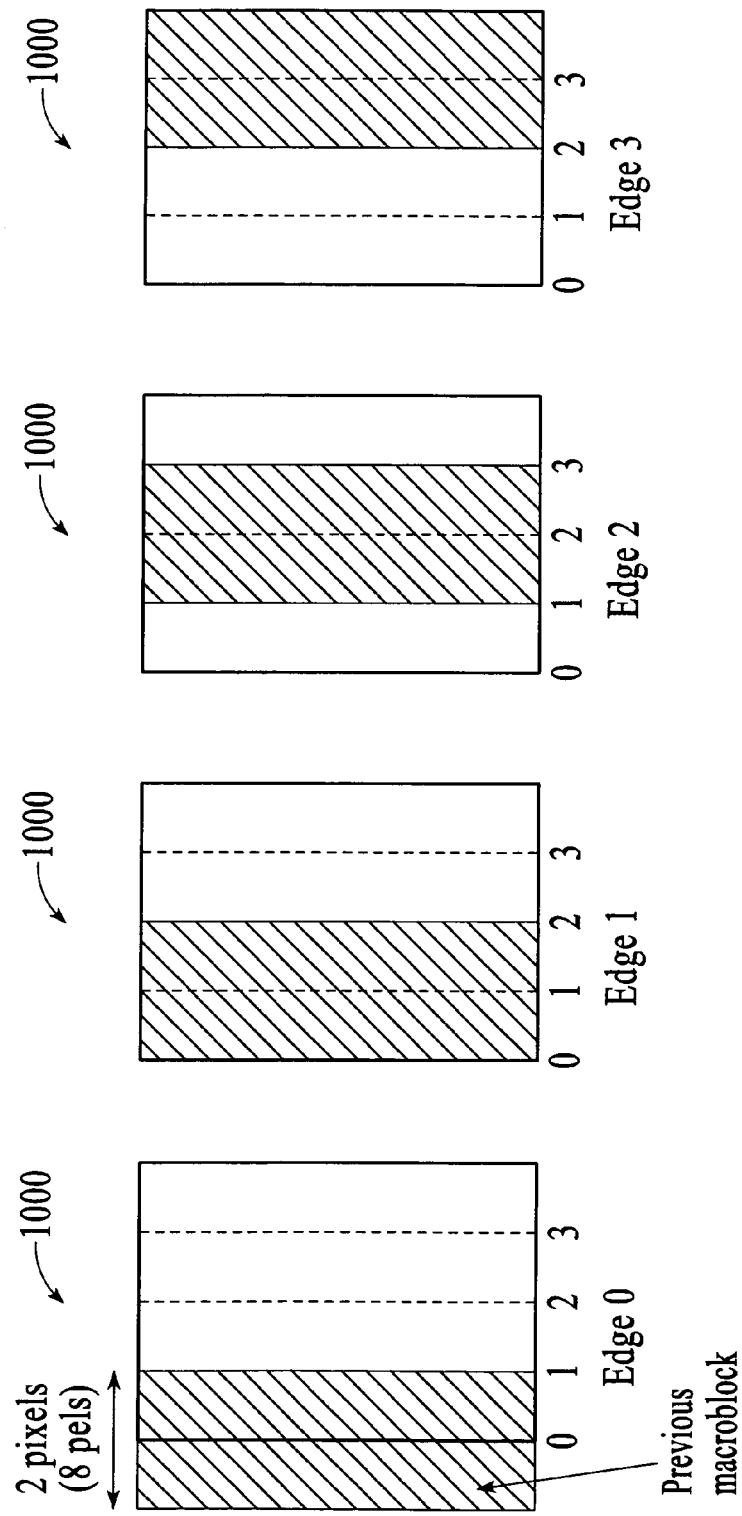

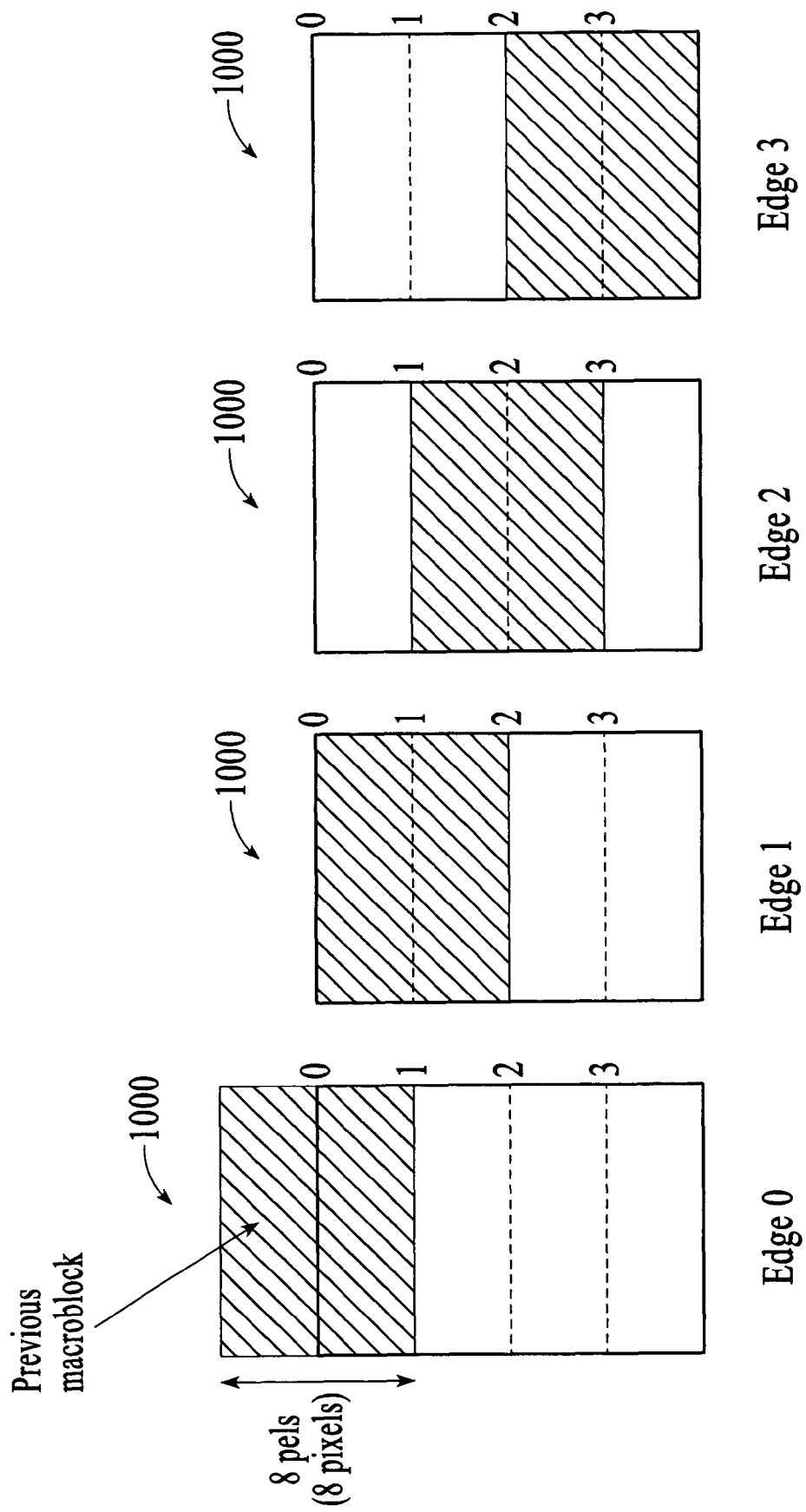

- Early Z-kill except in Quad
- 8 x 8 tiles vs. 16 x 16

Filter 2 edges into 3 render targets

Writing to *3* Render Targets
Each RT represents a side of the edge

First Vertical pass

- Rendering 8 pixels, top 4 is top half of edge bottom 4 is bottom half of edge

Writing to *4* Render Targets
Each RT represents a side of the edge

Writing to *4* Render Targets
Each RT represents a side of the edge

Writing to *4* Render Targets
Each RT represents a side of the edge

PARALLEL DECODING METHOD AND SYSTEM FOR HIGHLY COMPRESSED DATA

TECHNICAL FIELD

The invention is in the field of decoding video data that has been encoded according to a specified encoding format, and more particularly, decoding the video data to optimize use of data processing hardware.

BACKGROUND

Digital video playback capability is increasingly available in all types of hardware platforms, from inexpensive consumer-level computers to super-sophisticated flight simulators. Digital video playback includes displaying video that is accessed from a storage medium or streamed from a real-time source, such as a television signal. As digital video becomes nearly ubiquitous, new techniques to improve the quality and accessibility of the digital video are being developed. For example, in order to store and transmit digital video, it is typically compressed or encoded using a format specified by a standard. Recently H.264, a video compression scheme, or codec, has been adopted by the Motion Pictures Expert Group (MPEG) to be the video compression scheme for the MPEG-4 format for digital media exchange. H.264 is MPEG-4 Part 10. H.264 was developed to address various needs in an evolving digital media market, such as relative inefficiency of older compression schemes, the availability of greater computational resources today, and the increasing demand for High Definition (HD) video, which requires the ability to store and transmit about six times as much data as required by Standard Definition (SD) video.

H.264 is an example of an encoding scheme developed to have a much higher compression ratio than previously available in order to efficiently store and transmit higher quantities of video data, such as HD video data. For various reasons, the higher compression ratio comes with a significant increase in the computational complexity required to decode the video data for playback. Most existing personal computers (PCs) do not have the computational capability to decode HD video data compressed using high compression ratio schemes such as H.264. Therefore, most PCs cannot playback highly compressed video data stored on high-density media such as optical Blu-ray discs (BD) or HD-DVD discs. Many PCs include dedicated video processing units (VPUs) or graphics processing units (GPUs) that share the decoding tasks with the PC. The GPUs may be add-on units in the form of graphics cards, for example, or integrated GPUs. However, even PCs with dedicated GPUs typically are not capable of BD or HD-DVD playback. Efficient processing of H.264/MPEG-4 is very difficult in a multi-pipeline processor such as a GPU. For example, video frame data is arranged in macro blocks according to the MPEG standard. A macro block to be decoded has dependencies on other macro blocks, as well as intrablock dependencies within the macro block. In addition, edge filtering of the edges between blocks must be completed. This normally results in algorithms that simply complete decoding of each macro block sequentially, which involves several computationally distinct operations involving different hardware passes. This results in failure to exploit the parallelism that is inherent in modern day processors such as multi-pipeline GPUs.

One approach to allowing PCs to playback high-density media is the addition of separate decoding hardware and software. This decoding hardware and software is in addition to any existing graphics card(s) or integrated GPUs on the PC. This approach has various disadvantages. For example, the hardware and software must be provided for each PC which is to have the decoding capability. In addition, the decoding hardware and software decodes the video data without particular consideration for optimizing the graphics processing hardware which will display the decoded data.

It would be desirable to have a solution for digital video data that allows a PC user to playback high-density media such as BD or HD-DVD without the purchase of special add-on cards or other hardware. It would also be desirable to have such a solution that decodes the highly compressed video data for processing so as to optimize the use of the graphics processing hardware, while minimizing the use of the CPU, thus increasing speed and efficiency.

BRIEF DESCRIPTION OF THE DRAWINGS

FIGS. 6A, 6B, and 6C are diagrams of a macro block divided into different blocks according to an embodiment.

FIGS. 11A, 11B, 11C, and 11D show the pels involved in vertical deblocking for each vertical edge in a macro block according to an embodiment.

FIGS. 12A, 12B, 12C, and 12D show the pels involved in horizontal deblocking for each horizontal edge in a macro block according to an embodiment.

The drawings represent aspects of various embodiments for the purpose of disclosing the invention as claimed, but are not intended to be limiting in any way.

DETAILED DESCRIPTION

Embodiments of a method and system for layered decoding of video data encoded according to a standard that includes a high-compression ratio compression scheme are described herein. The term "layer" as used herein indicates one of several distinct data processing operations performed on a frame of encoded video data in order to decode the frame. The distinct data processing operations include, but are not limited to, inter-prediction, intra-prediction, and deblocking. Prior decoding methods performed all of the distinct data processing operations on a unit of data within the frame before moving to a next unit of data within a frame. In contrast, embodiments of the invention perform a layer of processing on an entire frame at one time, and then perform a next layer of processing. In other embodiment, multiple frames are processed in parallel using the same algorithms described below. The encoded data is pre-processed in order to allow layered decoding without errors, such as errors that might result from processing interdependent data in an incorrect order. The pre-processing prepares various sets of encoded data to be operated on in parallel by different processing pipelines, thus optimizing the use of the available graphics processing hardware and minimizing the use of the CPU.

Figure 1:
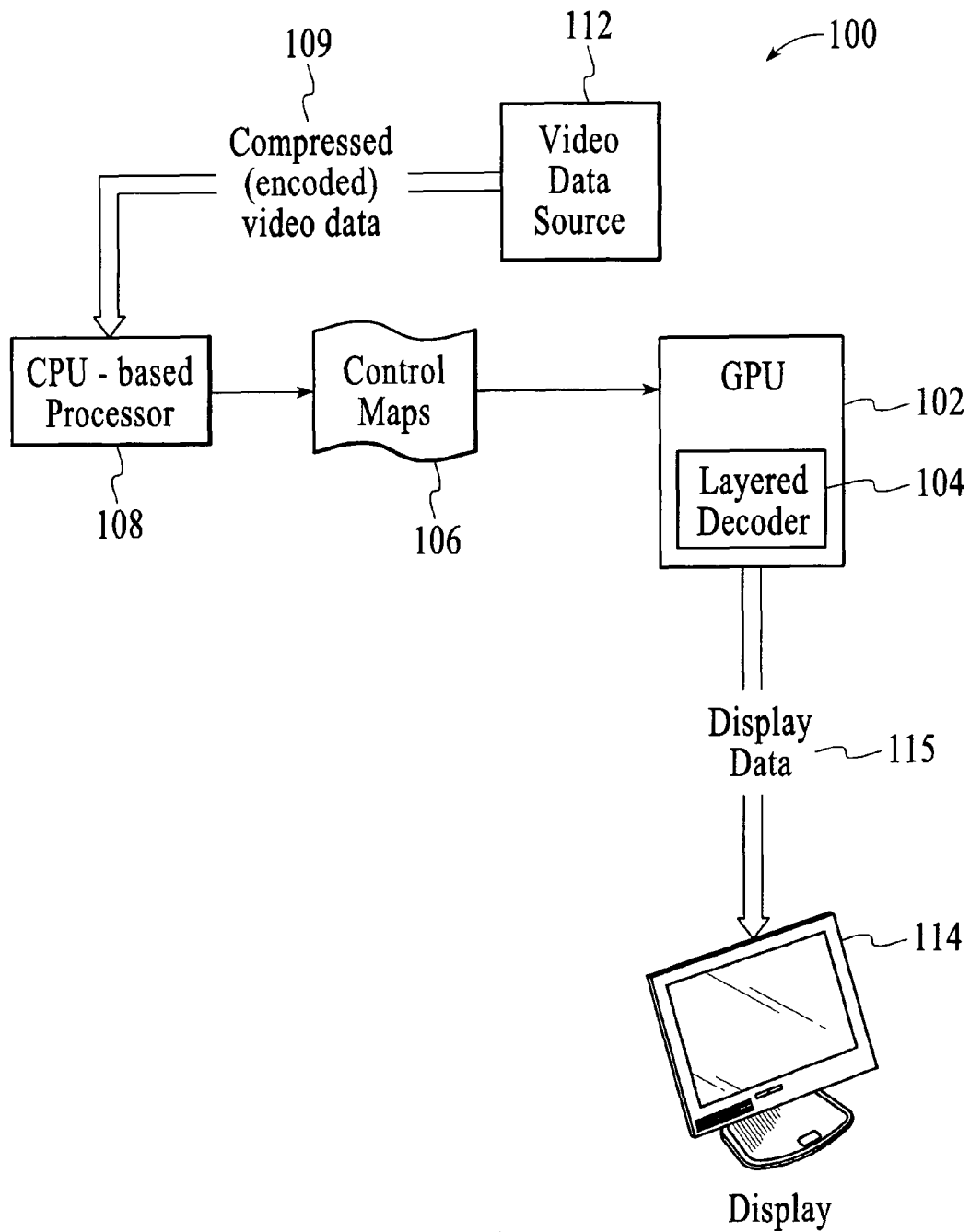
FIG. 1 is a block diagram of a system with graphics processing capability according to an embodiment.

FIG. 1 is a block diagram of a system 100 with graphics processing capability according to an embodiment. The system 100 includes a video data source 112. The video data source 112 may be a storage medium such as a Blu-ray disc or an HD-DVD disc. The video data source may also be a television signal, or any other source of video data that is encoded according to a widely recognized standard, such as one of the MPEG standards. Embodiments of the invention will be described with reference to the H.264 compression scheme, which is used in the MPEG-4 standard. Embodiments provide particular performance benefits for decoding H.264 data, but the invention is not so limited. In general, the particular examples given are for thorough illustration and disclosure of the embodiments, but no aspects of the examples are intended to limit the scope of the invention as defined by the claims.

System 100 further includes a central processing unit (CPU)-based processor 108 that receives compressed, or encoded, video data 109 from the video data source 112. The CPU-based processor 108, in accordance with the standard governing the encoding of the data 109, processes the data 109 and generates control maps 106 in a known manner. The control maps 106 include data and control information formatted in such a way as to be meaningful to video processing software and hardware that further processes the control maps 106 to generate a picture to be displayed on a screen. In an embodiment, the system 100 includes a graphics processing unit (GPU) 102 that receives the control maps 106. The GPU 102 may be integral to the system 100. For example, the GPU 102 may be part of a chipset made for inclusion in a personal computer (PC) along with the CPU-based processor 108. Alternatively, the GPU 102 may be a component that is added to the system 100 as a graphics card or video card, for example. In embodiments described herein, the GPU 102 is designed with multiple processing cores, also referred to herein as multiple processing pipelines or multiple pipes. In an embodiment, the multiple pipelines each contain similar hardware and can all be run simultaneously on different sets of data to increase performance. In an embodiment, the GPU 102 can be classed as a single instruction multiple data (SIMD) architecture, but embodiments are not so limited.

The GPU 102 includes a layered decoder 104, which will be described in greater detail below. In an embodiment, the layered decoder 104 interprets the control maps 106 and pre-processes the data and control information so that processing hardware of the GPU 102 can optimally perform parallel processing of the data. The GPU 102 thus performs hardware-accelerated video decoding. The GPU 102 processes the encoded video data and generates display data 115 for display on a display 114. The display data 115 is also referred to herein as frame data or decoded frames. The display 114 can be any type of display appropriate to a particular system 100, including a computer monitor, a television screen, etc.

In order to facilitate describing the embodiments, an overview of the type of video data that will be referred to in the description now follows. A SIMD architecture is most effective when it conducts multiple, massively parallel computations along substantially the same control flow path. In the examples described herein, embodiments of the layered decoder 104 include an H.264 decoder running GPU hardware to minimize the flow control deviation in each shader thread. A shader as referred to herein is a software program specifically for rendering graphics data or video data as known in the art. A rendering task may use several different shaders.

The following is a brief explanation of some of the terminology used in this description.

A luma or chroma 8-bit value is called a pel. All luma pels in a frame are named in the Y plane. The Y plane has a resolution of the picture measured in pels. For example, if the picture resolution is said to be 720×480, the Y plane has 720×480 pels. Chroma pels are divided into two planes: a U plane and a V plane. For purposes of the examples used to describe the embodiments herein, a so-called 420 format is used. The 420 format uses U and V planes having the same resolution, which is half of the width and height of the picture. In a 720×480 example, the U and V resolution is 360×240 measured in pels.

Hardware pixels are pixels as they are viewed by the GPU on the read from memory and the write to the memory. In most cases this is a 4-channel, 8-bit per channel pixel commonly known as RGBA or ARGB.

As used herein, "pixel" also denotes a 4×4 pel block selected as a unit of computation. It means that as far as the scan converter is concerned this is the pixel, causing the pixel shader to be invoked per each 4×4 block. In an embodiment, to accommodate this view, the resolution of the target surface presented to the hardware is defined as one quarter of the width and of the height of the original picture resolution measured in pels. For example, returning to the 720×480 picture example, the resolution of the target is 180×120.

The block of 16×16 pels, also referred to as a macro block, is the maximal semantically unified chunk of video content, as defined by MPEG standards. A block of 4×4 pels is the minimal semantically unified chunk of the video content.

There are 3 different physical target picture or target frame layouts employed depending on the type of the picture being decoded. The target frame layouts are illustrated in Tables 1-3.

Let PicWidth be the width of the picture in pels (which is the same as bytes) and PicHeight be the height of the picture in scan lines (for example, 720×480 in the previous example. Table 1 shows the physical layout based on the picture type.

TABLE 1

|   | Frame/AFF | Field Even | Field Odd |
|---|---|---|---|
| Y | {0, 0}, {PicWidth − 1, PicHeight − 1} | {0, 0}, {PicWidth − 1, PicHeight/2 − 1} | {0, PicHeight/2}, {PicWidth − 1, PicHeight} |
| U | {0, PicHeight}, {PicWidth/2 − 1, 3 * PicHeight/2 − 1} | {0, PicHeight}, {PicWidth/2 − 1, 5 * PicHeight/4 − 1} | {0, 5 * PicHeight/4}, {PicWidth/2 − 1, 3 * PicHeight/2 − 1} |
| V | {PicWidth/2, PicHeight}, {PicWidth − 1, 3 * PicHeight/2 − 1} | {PicWidth/2, PicHeight}, {PicWidth − 1, 5 * PicHeight/4 − 1} | {PicWidth/2, 5 * PicHeight/4}, {PicWidth − 1, 3 * PicHeight/2 − 1} |

Following Tables 2 and 3 are visual representations of Table 1 for a frame/AFF picture and for a field picture, respectively.

TABLE 2

| Frame/AFF picture | |
|---|---|
| Y plane | |
| U plane | V plane |

TABLE 3

| Field picture | |
|---|---|
| Y plane even | |
| Y plane odd | |
| U plane even | V plane even |
| U plane odd | V plane odd |

The field type picture keeps even and odd fields separately until a last "interleaving" pass. The AFF type picture keeps field macro blocks as two complimentary pairs until the last "interleaving" pass. The interleaving pass interleaves even and odd scan lines and builds one progressive frame.

Embodiments described herein include a hardware decoding implementation of the H.264 video standard. H.264 decoding contains three major parts: inter-prediction; intra-prediction; and deblocking filtering. In various embodiments, inter-prediction and intra-prediction are also referred to as motion compensation because of the effect of performing inter-prediction and intra-prediction.

According to embodiments a decoding algorithm consists of three "logical" passes. Each logical pass adds another layer of data onto the same output picture or frame. The first "logical" pass is the inter-prediction pass with added inversed transformed coefficients. The first pass produces a partially decoded frame. The frame includes macro blocks designated by the encoding process to be decoded using either inter-prediction or intra-prediction. Because only the inter-prediction macro blocks are decoded in the first pass, there will be "holes" or "garbage" data in place of intra-prediction macro blocks.

A second "logical" pass touches only intra-prediction macro blocks left after the first pass is complete. The second pass computes the intra-prediction with added inversed transformed coefficients.

A third pass is a deblocking filtering pass, which includes a deblock control map generation pass. The third pass updates pels of the same picture along the sub-block (e.g., 4×4 pels) edges.

The entire decoding algorithm as further described herein does not require intervention by the host processor or CPU. Each logical pass may include many physical hardware passes. In an embodiment, all of the passes are pre-programmed by a video driver, and the GPU hardware moves from one pass to another autonomously.

Figure 2:
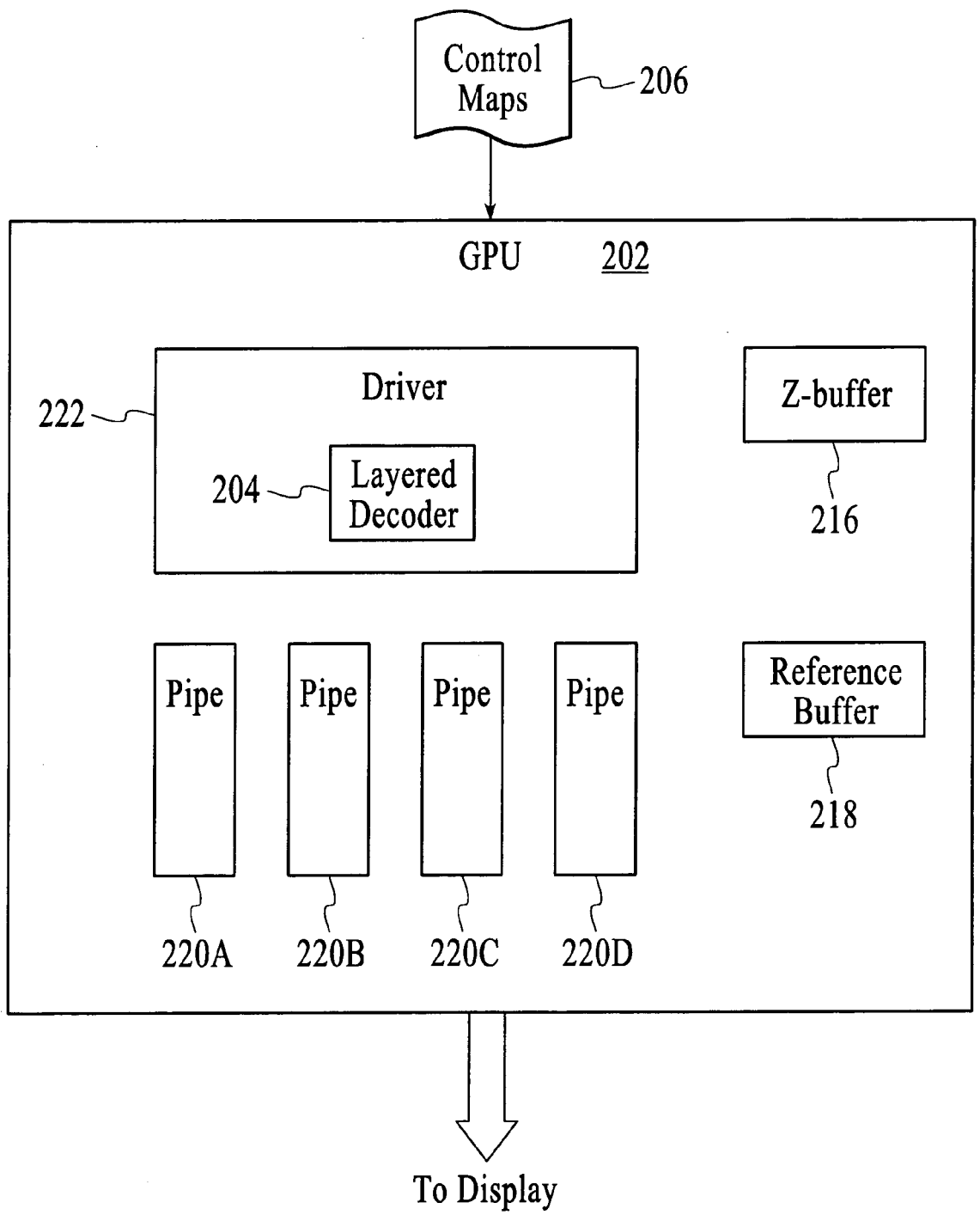
FIG. 2 is a block diagram of elements of a GPU according to an embodiment.

FIG. 2 is a block diagram of elements of a GPU 202 according to an embodiment. The GPU 202 receives control maps 206 from a source such as a host processor or host CPU. The GPU 202 includes a video driver 222 which, in an embodiment, includes a layered decoder 204. The GPU 202 also includes processing pipelines 220A, 220B, 220C, and 220D. In various embodiments, there could be less than four or more than four pipelines 220. In other embodiments, more than one GPU 202 may be combined to share processing tasks. The number of pipelines is not intended to be limiting, but is used in this description as a convenient number for illustrating embodiments of the invention. In many embodiments, there are significantly more than four pipelines. As the number of pipelines is increased, the speed and efficiency of the GPU is increased.

An advantage of the embodiments described is the flexibility and ease of use provided by the layered decoder 204 as part of the driver 222. The driver 222, in various embodiments, is software that can be downloaded by a user of an existing GPU to extend new layered decoding capability to the existing GPU. The same driver can be appropriate for all existing GPUs with similar architectures. Multiple drivers can be designed and made available for different architectures. One common aspect of drivers including layered decoders described herein is that they immediately allow efficient decoding of video data encoded using H.264 and similar formats by maximizing the use of available graphics processing pipelines on an existing GPU.

The GPU 202 further includes a Z-buffer 216 and a reference buffer 218. As further described below, Z buffer is used as control information, for example to decide which macro blocks are processed and which are not in any layer. The reference buffer 218 is used to store a number of decoded frames in a known manner. Previously decoded frames are used in the decoding algorithm, for example to predict what a next or subsequent frame might look like.

Figure 3:
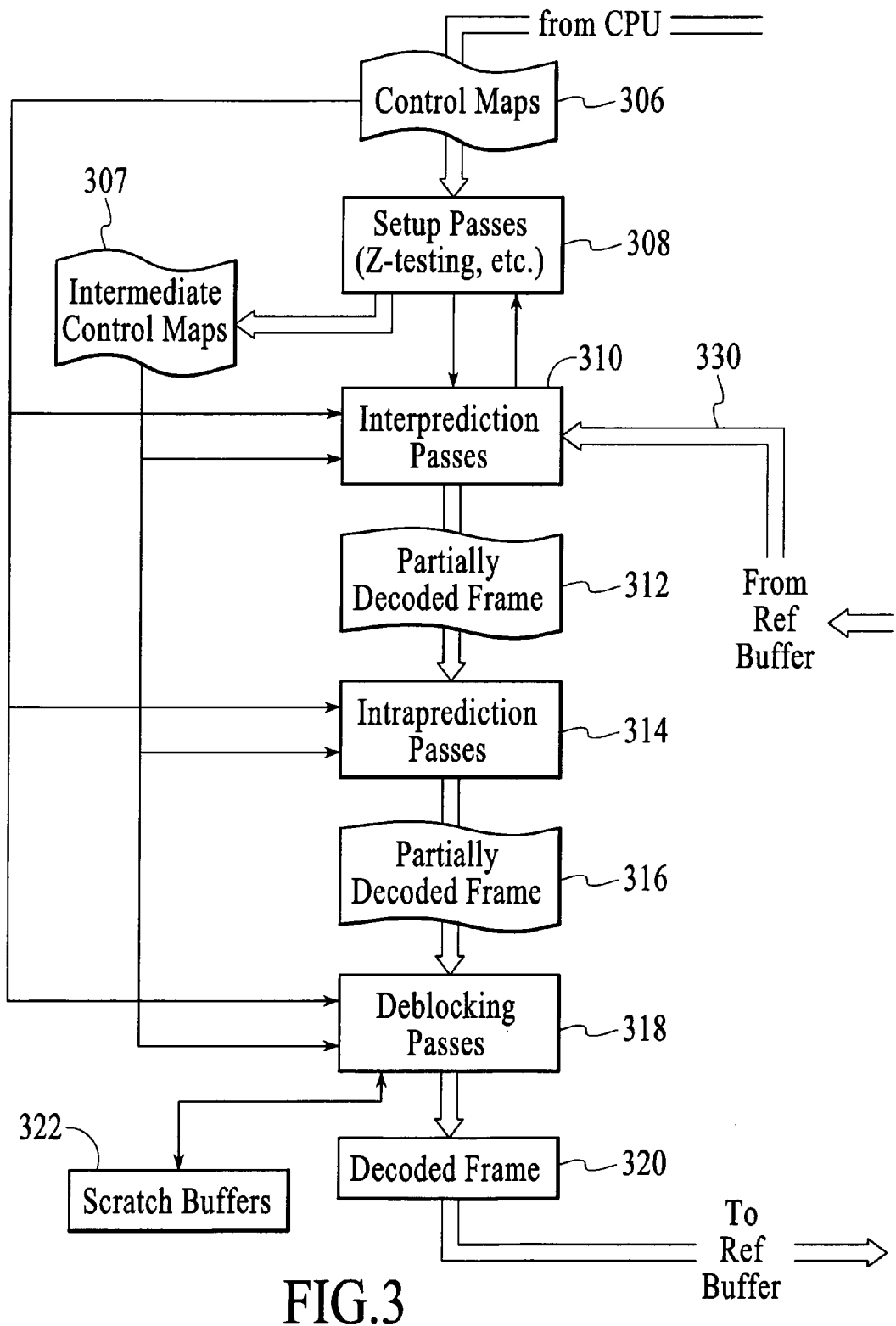
FIG. 3 is a diagram illustrating a data and control flow of a decoding process according to an embodiment.

FIG. 3 is a diagram illustrating a flow of data and control in layered decoding according to an embodiment. Control maps 306 are generated by a host processor such as a CPU, as previously described. The control maps 306 are generated according to the applicable standard, for example MPEG-4. The control maps 306 are generated on a per-frame basis. A control map 306 is received by the GPU (as shown in FIGS. 1 and 2). The control maps 306 include various information used by the GPU to direct the graphics processing according to the applicable standard. For example, as previously described, the video frame is divided into macro blocks of certain defined sizes. Each macro block may be encoded such that either inter-prediction or intra-prediction must be used to decode it. The decision to encode particular macro blocks in particular ways is made by the encoder. One piece of information conveyed by the control maps 306 is which decoding method (e.g., inter-prediction or intra-prediction) should be applied to each macro block.

Because the encoding scheme is a compression of data, one of the aspects of the overall scheme is a comparison of one frame to the next in time to determine what video data does not change, and what video data changes, and by how much. Video data that does not change does not need to be explicitly expressed or transmitted, thus allowing compression. The process of decoding, or decompression, according to the MPEG standards, involves reading information in the control maps 306 including this change information per unit of video data in a frame, and from this information, assembling the frame. For example, consider a macro block whose intensity value has changed from one frame to another. During inter-prediction, the decoder reads a residual from the control maps 306. The residual is an intensity value expressed as a number. The residual represents a change in intensity from one frame to the next for a unit of video data.

The decoder must then determine what the previous intensity value was and add the residual to the previous value. The control maps 306 also store a reference index. The reference index indicates which previously decoded frame of up to sixteen previously decoded frames should be accessed to retrieve the relevant, previous reference data. The control maps also store a motion vector that indicates where in the selected reference frame the relevant reference data is located. In an embodiment, the motion vector refers to a block of 4×4 pels, but embodiments are not so limited.

The GPU performs preprocessing on the control map 306, including setup passes 308, to generate intermediate control maps 307. The setup passes 308 include sorting surfaces for performing inter-prediction for the entire frame, intra-prediction for the entire frame, and deblocking for the entire frame, as further described below. The setup passes 308 also include intermediate control map generation for deblocking passes according to an embodiment. The setup passes 308 involve running "pre-shaders" that can be referred to as software programs of relatively small size (compared to the usual rendering shaders) to read the control map 306 without incurring the performance penalty for running the usual rendering shaders.

In general, the intermediate control maps 307 are the result of interpretation and reformulation of control map 306 data and control information so as to tailor the data and control information to run in parallel on the particular GPU hardware in an optimized way.

In yet other embodiments, all the control maps are generated by the GPU. The initial control maps are CPU-friendly and data is arranged per macro block. Another set of control maps can be generated from the initial control maps using the GPU, where data is arranged per frame (for example, one map for motion vectors, one map for residual).

After setup passes 308 generate intermediate control maps 307, shaders are run on the GPU hardware for inter-prediction passes 310. In some cases, inter-prediction passes 310 may not be available because the frame was encoded using intra-prediction only. It is also possible for a frame to be encoded using only inter-prediction. It is also possible for deblocking to be omitted.

The inter-prediction passes are guided by the information in the control maps 306 and the intermediate control maps 307. Intermediate control maps 307 include a map of which macro blocks are inter-prediction macro blocks and which macro blocks are intra-prediction macro blocks. Inter-prediction passes 310 read this "inter-intra" information and process only the macro blocks marked as inter-prediction macro blocks. The intermediate control maps 307 also indicate which macro blocks or portions of macro blocks may be processed in parallel such that use of the GPU hardware is optimized. In our example embodiment there are four pipelines which process data simultaneously in inter-prediction passes 310 until inter-prediction has been completed on the entire frame. In other embodiments, the solution described here can be scaled with the hardware such that more pipelines allow simultaneous processing of more data.

When the inter-prediction passes 310 are complete, and there are intra-predicted macro blocks, there is a partially decoded frame 312. All of the inter-prediction is complete for the partially decoded frame 312, and there are "holes" for the intra-prediction macro blocks. In some cases, the frame may be encoded using only inter-prediction, in which case the frame has no "holes" after inter-prediction.

Intra-prediction passes 314 use the control maps 306 and the intermediate control maps 307 to perform intra-prediction on all of the intra-prediction macro blocks of the frame. The intermediate control maps 307 indicate which macro blocks are intra-prediction macro blocks. Intra-prediction involves prediction of how a unit of data will look based on neighboring units of data within a frame. This is in contrast to inter-prediction, which is based on differences between frames. In order to perform intra-prediction on a frame, units of data must be processed in an order that does not improperly overwrite data.

When the intra-prediction passes 314 are complete, there is a partially decoded frame 316. All of the inter-prediction and intra-prediction operations are complete for the partially decoded frame 316, but deblocking is not yet performed. Decoding on a macro block level causes a potentially visible transition on the edges between macro blocks. Deblocking is a filtering operation that smoothes these transitions. In an embodiment, the intermediate control maps 307 include a deblocking map (if available) that indicates an order of edge processing and also indicates filtering parameter. No deblocking map is available if deblocking is not required. In deblocking, the data from adjacent macro block edges is combined and rewritten so that the visible transition is minimized. In an embodiment, the data to be operated on is written out to scratch buffers 322 for the purpose of rearranging the data to be optimally processed in parallel on the hardware, but embodiments are not so limited.

After the deblocking passes 318, a completely decoded frame 320 is stored in the reference buffer (reference buffer 218 of FIG. 2, for example). This is the reference buffer accessed by the inter-prediction passes 310, as shown by arrow 330.

Figure 4:
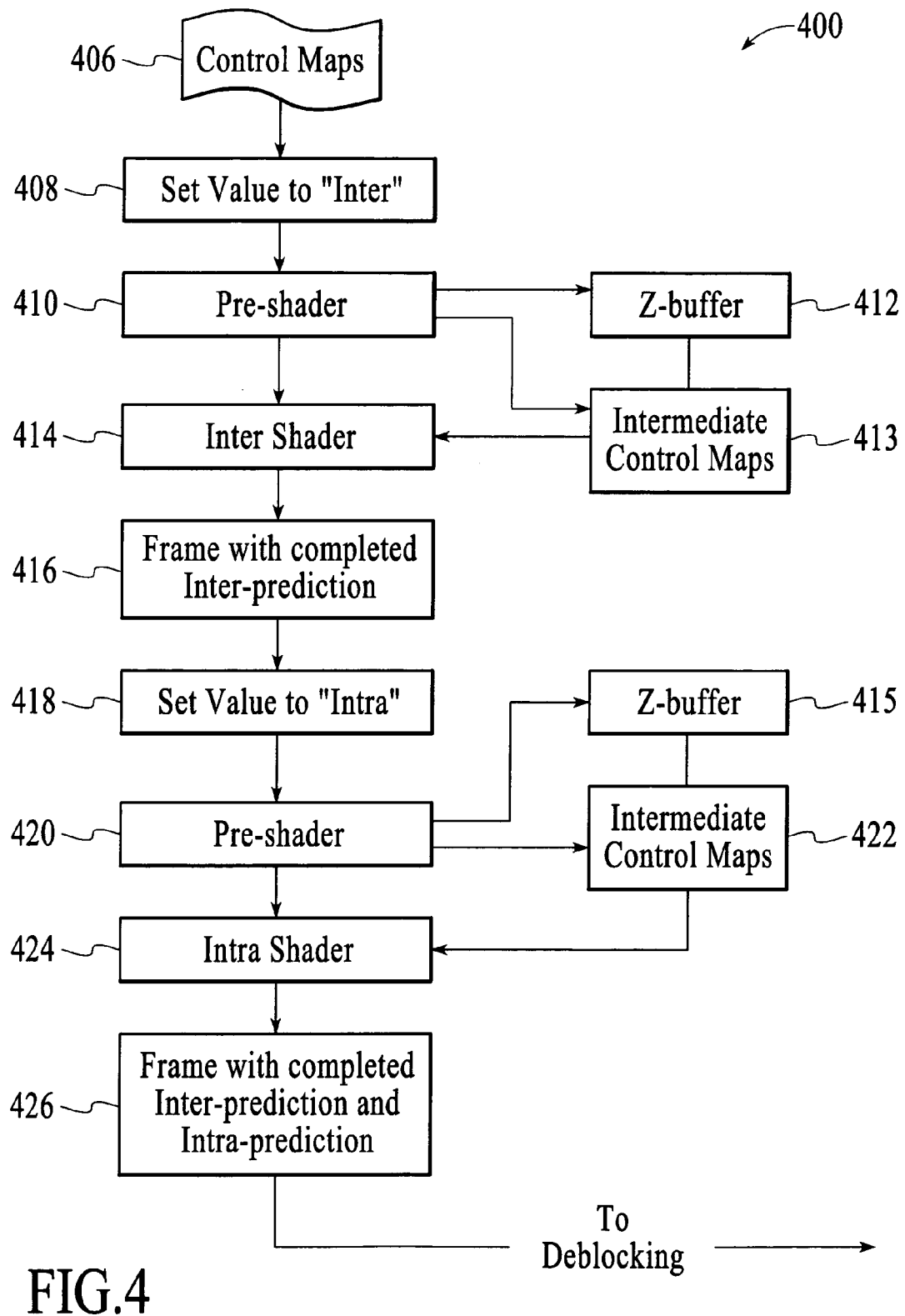
FIG. 4 is another diagram illustrating a data and control flow of a decoding process according to an embodiment.

FIG. 4 is another diagram illustrating a flow 400 of data and control in video data decoding according to an embodiment. FIG. 4 is another perspective of the operation illustrated in FIG. 3 with more detail. Control maps 406 are received by the GPU. In order to generate an intermediate control map that indicates which macro blocks are for inter-prediction, a comparison value in the Z-buffer is set to "inter" at 408. The comparison value can be a single bit that is set to "1" or "0", but embodiments are not so limited. With the comparison value set to "inter", a small shader, or "pre-shader" 410 is run on the control maps 406 to create the Z-buffer 412 and intermediate control maps 413. The Z-buffer includes information that tells an inter-prediction shader 414 which macro blocks are to be inter-predicted and which are not. In an embodiment this information is determined by Z-testing, but embodiments are not so limited. Macro blocks that are not indicated as inter-prediction macro blocks will not be processed by the inter-prediction shader 414, but will be skipped or discarded. The inter-prediction shader 414 is run on the data using control information from control maps 406 and an intermediate control map 413 to produce a partially decoded frame 416 in which all of the inter-prediction macro blocks are decoded, and all of the remaining macro blocks are not decoded.

In another implementation, the Z buffer testing of whether a macro block is an inter-prediction macro block or an intra-prediction macro block is performed within the inter prediction shader 414.

The value set at 408 is then reset at 418 to indicate intra-prediction. In another embodiment, the value is not reset, but rather another buffer is used. A pre-shader 420 creates a Z-buffer 415 and intermediate control maps 422. The Z-buffer includes information that tells an intra-prediction shader 424 which macro blocks are to be intra-predicted and which are not. In an embodiment this information is determined by Z-testing, but embodiments are not so limited. Macro blocks that are not indicated as intra-prediction macro blocks will not be processed by the intra-prediction shader 424, but will be skipped or discarded. The inter-prediction shader 414 is run on the data using control information from control maps 406 and an intermediate control map 422 to produce a frame 426 in which all of the inter-prediction macro blocks are decoded and all of the intra-prediction macro blocks are decoded. This is the frame that is processed in the deblocking operation.

Inter-Prediction

Figure 5:
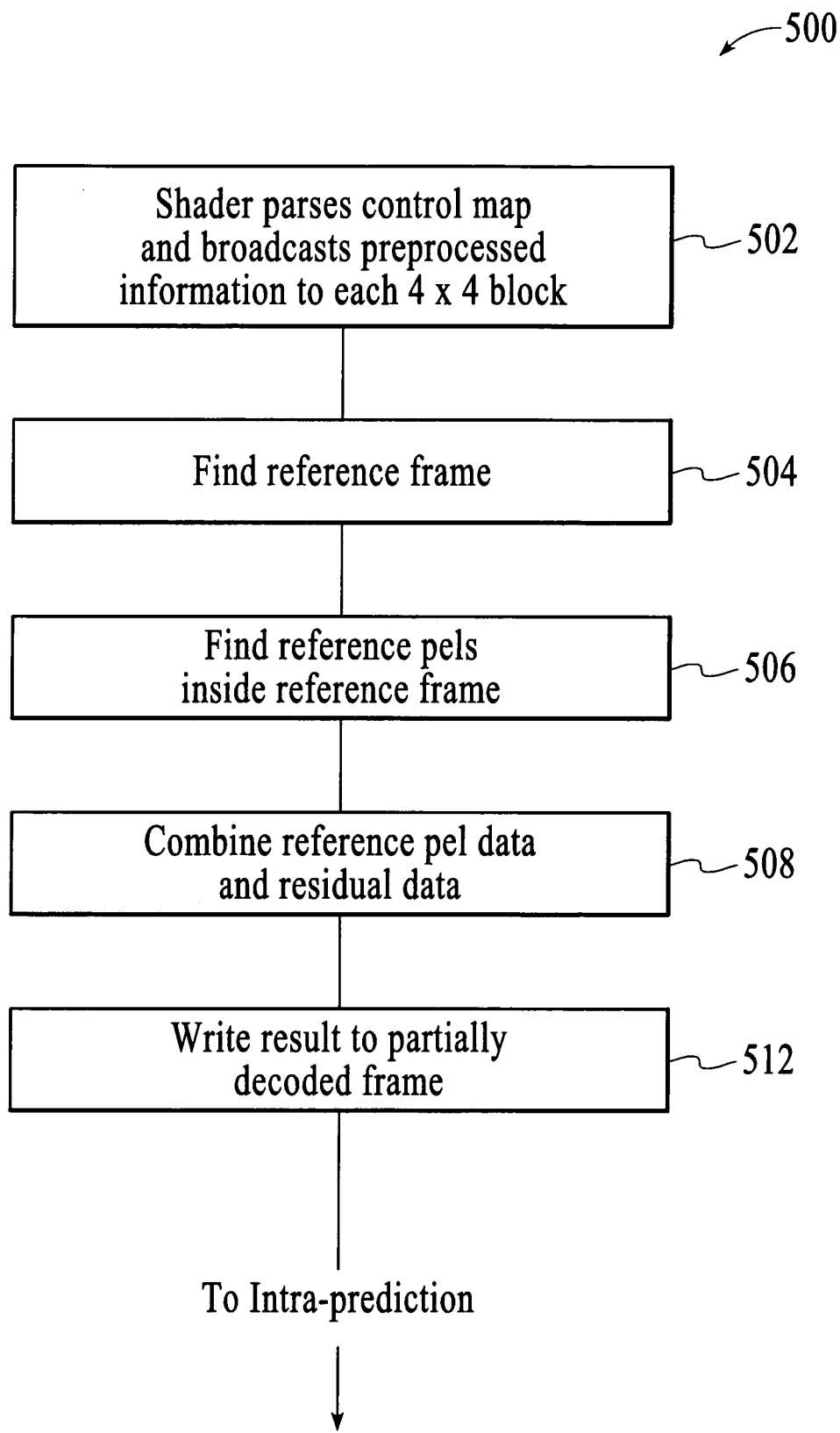
FIG. 5 is a diagram illustrating a data and control flow of an inter-prediction process according to an embodiment.

As previously discussed, inter-prediction is a way to use pels from reference pictures or frames (future (forward) or past (backward)) to predict the pels of the current frame. FIG. 5 is a diagram illustrating a data and control flow of an inter-prediction process 500 for a frame according to an embodiment. In an embodiment, the geometrical mesh for each inter-prediction pass consists of a grid of 4×4 rectangles in the Y part of the physical layout and 2×2 rectangles in the UV part (16×16 or 8×8 pels, where 16×16 pels is a macro block). A shader (in an embodiment, a vertex shader) parses the control maps for each macro block's control information and broadcasts the preprocessed control information to each pixel (in this case, a pixel is a 4×4-block) 502. The control information includes an 8-bit macro block header, multiple IT coefficients and their offsets, 16 pairs of motion vectors and 8 reference frame selectors. Z-testing as previously described indicates whether the macro block is not an inter-prediction block, in which case, its pixels will be "killed" or skipped from "rendering".

At 504, a particular reference frame among various reference frames in the reference buffer is selected using the control information. Then, at 506, the reference pels within the reference frame are found. In an embodiment, finding the correct position of the reference pels inside the reference frame includes computing the coordinates for each 4×4 block. The input to the computation is the top-left address of the target block in pels, and the delta obtained from the proper control map. The target block is the destination block, or the block in the frame that is being decoded.

As an example of finding reference pels, let MvDx, MvDy be the delta obtained from the control map. MvDx,MvDy are the x,y deltas computed in the appropriate coordinate system. This is true for a frame picture and frame macro block of an AFF picture in frame coordinates, and for a field picture and field macro block of an AFF picture in the field coordinate system of proper polarity. In an embodiment, the delta is the delta between the X,Y coordinates of the target block and the X,Y coordinates of the source (reference) block with 4-bit fractional precision.

When the reference pels are found, they are combined at 508 with the residual data (also referred to as "the residual") that is included in the control maps. The result of the combination is written to the destination in the partially decoded frame at 512. The process 500 is a parallel process and all blocks are submitted/executed in parallel. At the completion of the process, the frame data is ready for intra-prediction. In an embodiment, 4×4 blocks are processed in parallel as described in the process 500, but this is just an example. Other units of data could be treated in a similar way.

Intra-Prediction

As previously discussed, intra-prediction is a way to use pels from other macro blocks or portions of macro blocks within a pictures or frame to predict the pels of the current macro block or portion of a macro block. FIGS. 6A, 6B, and 6C are diagrams of a macro block divided into different blocks according to an embodiment. FIG. 6A is a diagram of a macro block that includes 16×16 pels. FIG. 6B is diagram of 8×8 blocks in a macro block. FIG. 6C is a diagram of 4×4 blocks in a macro block. Various intra-prediction cases exist depending on the encoding performed. For example, macro blocks in a frame may be divided into sub-blocks of the same size. Each sub-block may have from 8 cases to 14 cases, or shader branches. The frame configuration is known before decoding from the control maps.

In an embodiment, a shader parses the control maps to obtain control information for a macro block, and broadcasts the preprocessed control information to each pixel (in this case, a pixel is a 4×4-block). The information includes an 8-bit macro block header, a number of IT coefficients and their offsets, availability of neighboring blocks and their types, and for 16×16 and 8×8 blocks, prediction values and prediction modes. Z-testing as previously described indicates whether the macro block is not an intra-prediction block, in which case, its pixels will be "killed" or skipped from "rendering".

Figure 7:
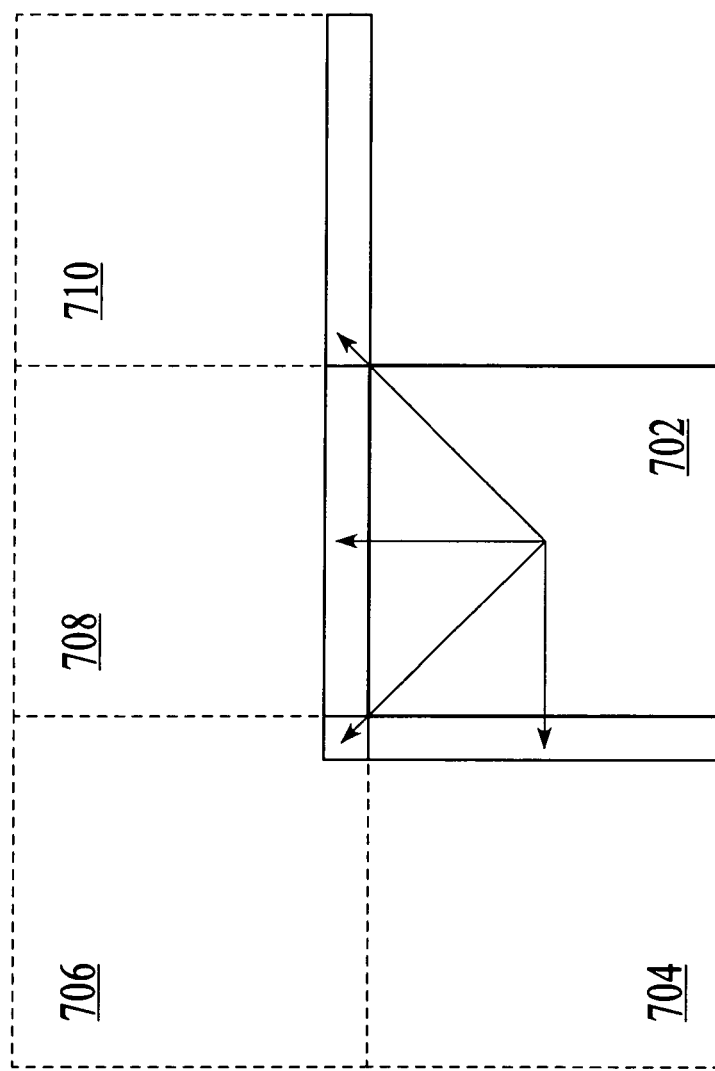
FIG. 7 is a block diagram illustrating intra-block dependencies according to an embodiment.

Dependencies exist between blocks because data from an encoded (not yet decoded) block should not be used to intra-predict a block. FIG. 7 is a block diagram that illustrates these potential intra-block dependencies. Sub-block 702 depends on its neighboring sub-blocks 704 (left), 706 (up-left), 708 (up), and 710 (up-right).

To avoid interdependencies inside the macro block the 16 pixels inside a 4×4 rectangle (Y plane) are rendered in a pass number indicated inside the cell. The intra-prediction for a UV macro block and a 16×16 macro block are processed in one pass. Intra-prediction for an 8×8 macro block is computed in 4 passes; each pass computes the intra-prediction for one 8×8 block from left to right and from top to bottom. Table 4 illustrates an example of ordering in a 4×4 case.

TABLE 4

| 0 | 1 | 2 | 3 |
|---|---|---|---|
| 2 | 3 | 4 | 5 |
| 4 | 5 | 6 | 7 |
| 6 | 7 | 8 | 9 |

To avoid interdependencies between the macro blocks the primitives (blocks of 4×4 pels) rendered in the same pass are organized into a list in a diagonal fashion.

Each cell below in Table 5 is a 4×4 (pixel) rectangle. The number inside the cell connects rectangles belonging to the same lists. Table 5 is an example for 16*8×16*8 in the Y plane:

TABLE 5

| 0 | 1 | 2 | 3 | 4 | 5 | 6 | 7 |
|---|---|---|---|---|---|---|---|
| 2 | 3 | 4 | 5 | 6 | 7 | 8 | 9 |
| 4 | 5 | 6 | 7 | 8 | 9 | 10 | 11 |
| 6 | 7 | 8 | 9 | 10 | 11 | 12 | 13 |
| 8 | 9 | 10 | 11 | 12 | 13 | 14 | 15 |
| 10 | 11 | 12 | 13 | 14 | 15 | 16 | 17 |
| 12 | 13 | 14 | 15 | 16 | 17 | 18 | 19 |
| 14 | 15 | 16 | 17 | 18 | 19 | 20 | 21 |

The diagonal arrangement keeps the following relation invariant separately for Y, U and V parts of the target surface:

Frame/Field Picture:
if k is the pass number, k>0 && k<DiagonalLength−1, MbMU[2] are coordinates of the macro block in the list, then MbMU[1]+MbMU[0]/2+1=k.

An AFF picture makes the process slightly more complex. The same example as above with an AFF picture is illustrated in Table 6.

TABLE 6

| 0 | 2 | 4 | 6 | 8 | 10 | 12 | 14 |
|---|---|---|---|---|---|---|---|
| 1 | 3 | 5 | 7 | 9 | 11 | 13 | 15 |
| 4 | 6 | 8 | 10 | 12 | 14 | 16 | 18 |
| 5 | 7 | 9 | 11 | 13 | 15 | 17 | 19 |
| 8 | 10 | 12 | 14 | 16 | 18 | 20 | 22 |
| 9 | 11 | 13 | 15 | 17 | 19 | 21 | 23 |
| 12 | 14 | 16 | 18 | 20 | 22 | 24 | 26 |
| 13 | 15 | 17 | 19 | 21 | 23 | 25 | 27 |

Inside all of the macro blocks, the pixel rendering sequence stays the same as described above.

There are three types of intra predicted blocks from the perspective of the shader: 16×16 blocks, 8×8 blocks and 4×4 blocks. The driver provides an availability mask for each type of block. The mask indicates which neighbor (upper, upper-right, upper-left or left is available). How the mask is used depends on the block. For some blocks not all masks are needed. For some blocks, instead of the upper-right masks, two left masks are used, etc. If the neighboring macro block is available, the pixels from it are used for the target block prediction according to the prediction mode provided to the shader by the driver.

There are two types of neighbors: upper (upper-right, upper, upper-left) and left.

The following describes computation of neighboring pel coordinates for different temporal types of macro blocks of different picture types according to an embodiment.

EvenMbXPU is a x coordinate of the complimentary pair of macro block

EvenMbYPU is a y coordinate of the complimentary pair of macro block

YPU is y coordinate of the current scan line.

MbXPU is a x coordinate of the macro block containing the YPU scan line

MbYPU is a y coordinate of the macro block containing the YPU scan line

MbYMU is a y coordinate of the same macro block in macro block units

MbYSzPU is a size of the macro block in Y direction.

Figure 8:
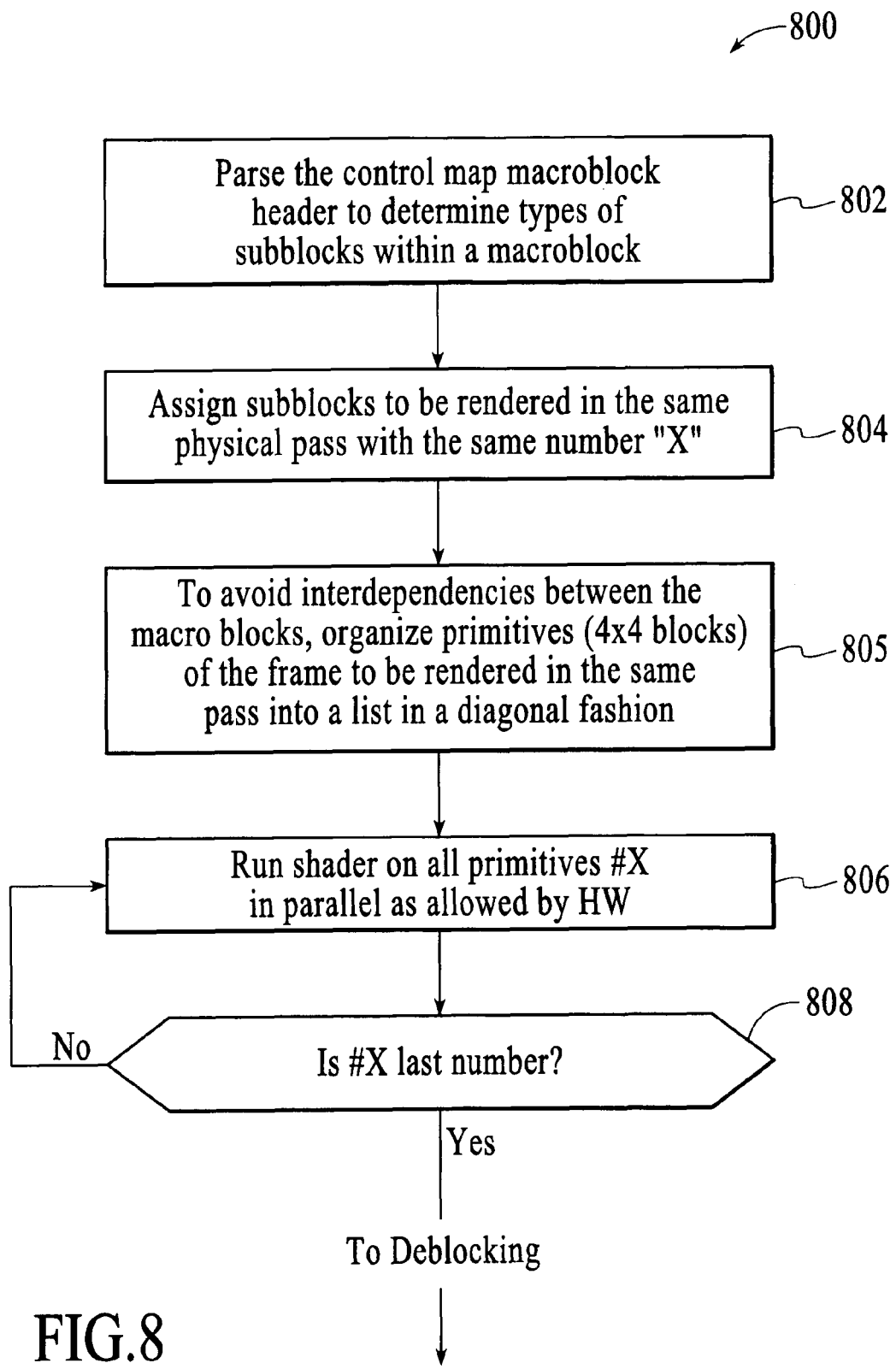
FIG. 8 is a diagram illustrating a data and control flow of an intra-prediction process according to an embodiment.

Frame/Field Picture:
Function to compute x,y coordinates of pels in the neighboring macro bloc to the left:
XNeighbrPU=MbXPU−1
YNeighbrPU=YPU
Function to compute x,y coordinates of pels in the neighboring macro bloc to the up:
XNeighbrPU=MbXPU
YNeighbrPU=MbYPU−1;
AFF Picture:
Function to compute x,y coordinates of pels in the neighboring macro bloc to the left:
EvenMbYPU=(MbYMU/2)*2
XNeighbrPU=MbXPU−1
Frame→Frame:
Field→Field:
  YNeighbrPU=YPU
  break;
Frame→Field:
// Interleave scan lines from even and odd neighboring field macro block
  YIsOdd=YPU %2
  YNeighbrPU=EvenMbYPU+(YPU−EvenMbYPU)/2+ YIsOdd*MbYSzPU
  break;
Field→Frame:
// Take only even or odd scan lines from the neighboring pair of frame macro blocks.
  MbIsOdd=MbYMU % 2
  YNeighbrPU=EvenMbYPU+(YPU−MbYPU)*2+ MbIsOdd
Function to compute x,y coordinates of pels in the neighboring macro bloc to the up:
MbIsOdd=MbYMU % 2
XNeighbrPU=MbXPU
Frame→Frame:
Frame→Field:
  YNeighbrPU=MbYPU−1−MbYSzPU*(1−MbIsOdd);
  break;
Field→Field:
  MbIsOdd=1; // it allows always to elevate into the macro block of the same polarity.
Field→Frame:
  YNeighbrPU=MbYPU−MbYSzPU*MbIsOdd+MbIsOdd−2;
  break;

FIG. 8 is a diagram illustrating a data and control flow 800 of an intra-prediction process according to an embodiment. At 802, the layered decoder parses the control map macro block header to determine types of subblocks within a macro block. The subblocks identified to be rendered in the same physical pass are assigned the same number "X" at 804. To avoid interdependencies between macro blocks, primitives to be rendered in the same pass are organized into lists in a diagonal fashion at 805. A shader is run on the subblocks with the same number "X" at 806. The subblocks are processed on the hardware in parallel using the same shader, and the only limitation on the amount of data processed at one time is the amount of available hardware.

At 808, it is determined whether number "X" is the last number among the numbers designating subblocks yet to be processed. If "X" is not the last number, the process returns to 806 to run the shader on subblocks with a new number "X". If "X" is the last number, then the frame is ready for the deblocking operation.

Deblocking Filtering

Figure 9:
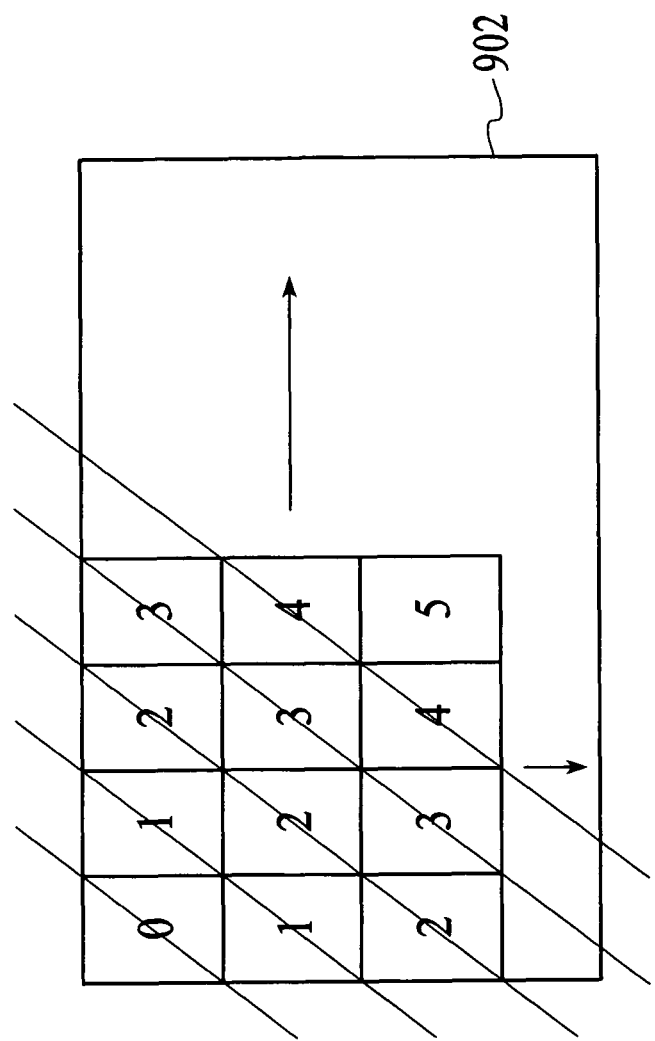
FIG. 9 is a block diagram of a frame after inter-prediction and intra-prediction have been performed according to an embodiment.

After inter-prediction and intra-prediction are completed for the entire frame, the frame is an image without any "holes" or "garbage". The edges between and inside macro blocks are filtered with a deblocking filter to ease the transition that results from decoding on a macro block level. FIG. 9 is a block diagram of a frame 902 after inter-prediction and intra-prediction have been performed. FIG. 9 illustrates the deblocking interdependency among macro blocks. Some of the macro blocks in frame 902 are shown and numbered. Each macro block depends on its neighboring left and top macro blocks, meaning these left and top neighbors must be deblocked first. For example, macro block 0 has no dependencies on other macro blocks. Macro blocks 1 each depend on macro block 0, and so on. Each similarly numbered macro block has similar interdependencies. Embodiments of the invention exploit this arrangement by recognizing that all of the similar macro blocks can be rendered in parallel. In an embodiment, each diagonal strip is rendered in a separate pass. The deblocking operation moves through the frame 902 to the right and down as shown by the arrows in FIG. 9.

Figure 10B:
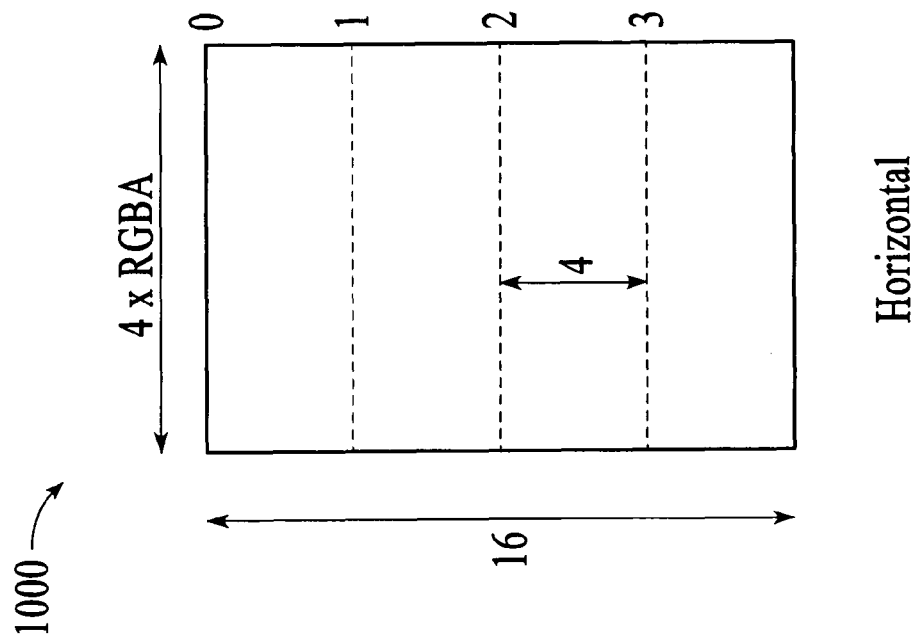
FIGS. 10A and 10B are block diagrams of macro blocks illustrating vertical and horizontal deblocking, which are performed on each macro block according to an embodiment.
Figure 10A:
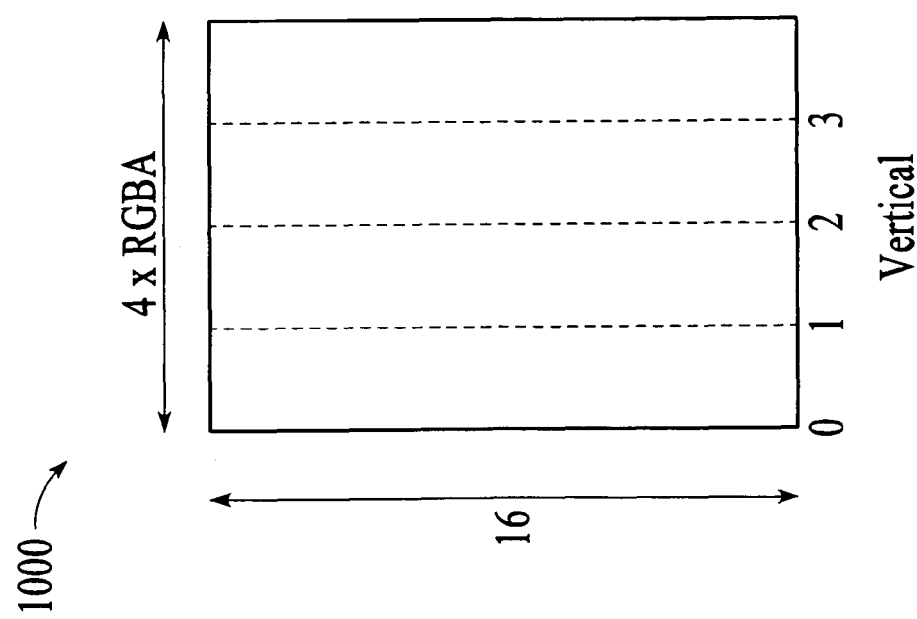

FIGS. 10A and 10B are block diagrams of macro blocks illustrating vertical and horizontal deblocking, which are performed on each macro block. FIG. 10A is a block diagram of a macro block 1000 that shows how vertical deblocking is arranged. Macro block 1000 is 16×16 pels, as previously defined. This includes 16×4 pixels as pixels are defined in an embodiment. The numbered dashed lines 0, 1, 2, and 3 designate vertical edges to be deblocked. In other embodiment there may be more or less pels per pixel, for example depending on a GPU architecture.

FIG. 10B is a block diagram of the macro block 1000 that shows how horizontal deblocking is arranged. The numbered dashed lines 0, 1, 2, and 3 designate horizontal edges to be deblocked.

FIGS. 11A, 11B, 11C, and 11D show the pels involved in vertical deblocking for each vertical edge in the macro block 1000. In FIG. 11A, the shaded pels, including pels from a previous (left neighboring) macro block are used in the deblocking operation for edge 0.

In FIG. 11b, the shaded pels on either side of edge 1 are used in a vertical deblocking operation for edge 1.

In FIG. 11C, the shaded pels on either side of edge 2 are used in a vertical deblocking operation for edge 2.

In FIG. 1D, the shaded pels on either side of edge 3 are used in a vertical deblocking operation for edge 3.

FIGS. 12A, 12B, 12C, and 12D show the pels involved in horizontal deblocking for each horizontal edge in the macro block 1000. In FIG. 12A, the shaded pels, including pels from a previous (top neighboring) macro block are used in the deblocking operation for edge 0.

In FIG. 12b, the shaded pels on either side of edge 1 are used in a horizontal deblocking operation for edge 1.

In FIG. 12C, the shaded pels on either side of edge 2 are used in a horizontal deblocking operation for edge 2.

In FIG. 12D, the shaded pels on either side of edge 3 are used in a horizontal deblocking operation for edge 3.

In an embodiment, the pels to be processed in the deblocking algorithm are copied to a scratch buffer (for example, see FIG. 3) in order to optimally arrange the pel data to be processed for a particular graphics processing, or video processing architecture. A unit of data on which the hardware operates is referred to as a "quad". In an embodiment, a quad is 2×2 pixels, where a pixel is meant as a "hardware pixels". A hardware pixel can be 2×2 of 4×4 pels, 8×8 pels, or 2×2 of ARGB pixels, or others arrangements. In an embodiment, the data to be processed in horizontal deblocking and vertical deblocking is first remapped onto a quad structure in the scratch buffer. The deblocking processing is performed and the result is written to the scratch buffer, then back to the frame in the appropriate location. In the example architecture, the pels are grouped to exercise all of the available hardware. The pels to be processed together may come from anywhere in the frame as long as the macro blocks from which they come are all of the same type. Having the same type means having the same macro block dependencies. The use of a quad as a unit of data to be processed and the processing of four quads at one time are just one example of an implementation. The same principles applied in rearranging the pel data for processing can be applied to any different graphics processing architecture.

In an embodiment, deblocking is performed for each macro block starting with a vertical pass (vertical edge 0, vertical edge 1, vertical edge 2, vertical edge 3) and then a horizontal pass (horizontal edge 0, horizontal edge 1, horizontal edge 2, horizontal edge 3). The parallelism inherent in the hardware design is exploited by processing macro blocks that have no dependencies (also referred to as being independent) together. According to various embodiments, any number of independent macro blocks at may be processed at the same time, limited only by the hardware.

FIGS. 13-19 are block diagrams that illustrate mapping to the scratch buffer according to an embodiment. These diagrams are an example of mapping to accommodate a particular architecture and are not intended to be limiting.

Figure 13B:
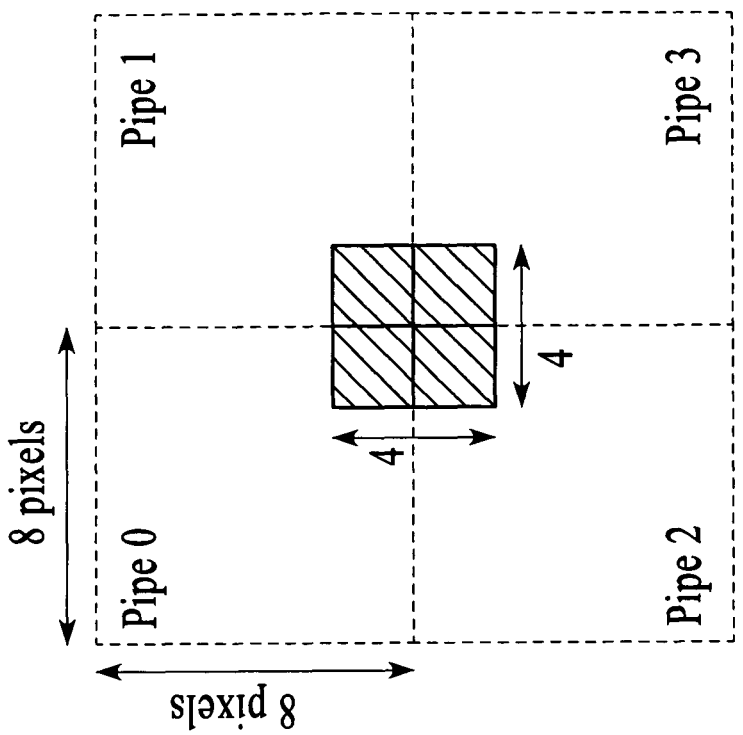
FIG. 13B is a block diagram that shows the conceptual mapping of the shaded data from FIG. 13A into a scratch buffer according to an embodiment.
Figure 13A:
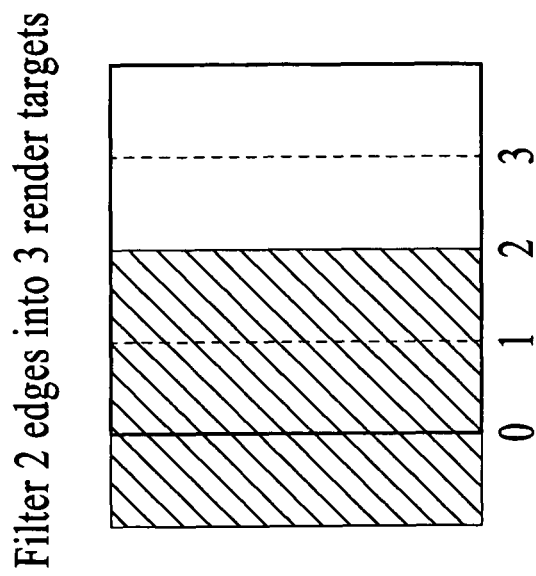
FIG. 13A is a block diagram of a macro block that shows vertical edges 0-3 according to an embodiment.

FIG. 13A is a block diagram of a macro block that shows vertical edges 0-3. The shaded area represents data involved in a deblocking operation for edges 0 and 1, including data (on the far left) from a previous macro block. FIG. 13B is a block diagram that shows the conceptual mapping of the shaded data from FIG. 13A into the scratch buffer. In an embodiment, there are three scratch buffers that allow 16×3 pixels to fit in an area of 4×4 pixels, but other embodiments are possible within the scope of the claims. In an embodiment, there are three scratch buffer that allow 16×3 pixels to fit in an area of 4×4 pixels, but other embodiments are possible within the scope of the embodiments. In an embodiment deblocking mapping allows optimal use of four pipelines (Pipe 0, Pipe 1, Pipe 2, and Pipe 3) in the example architecture that has been previously described herein. However, the concepts described with reference to specific example architectures are equally applicable to other architectures not specifically described. For example, deblocking as described is also applicable or adaptable to future architectures (for example, 8×8 or 16×16) in which the screen tiling may not really exist.

Figure 14B:
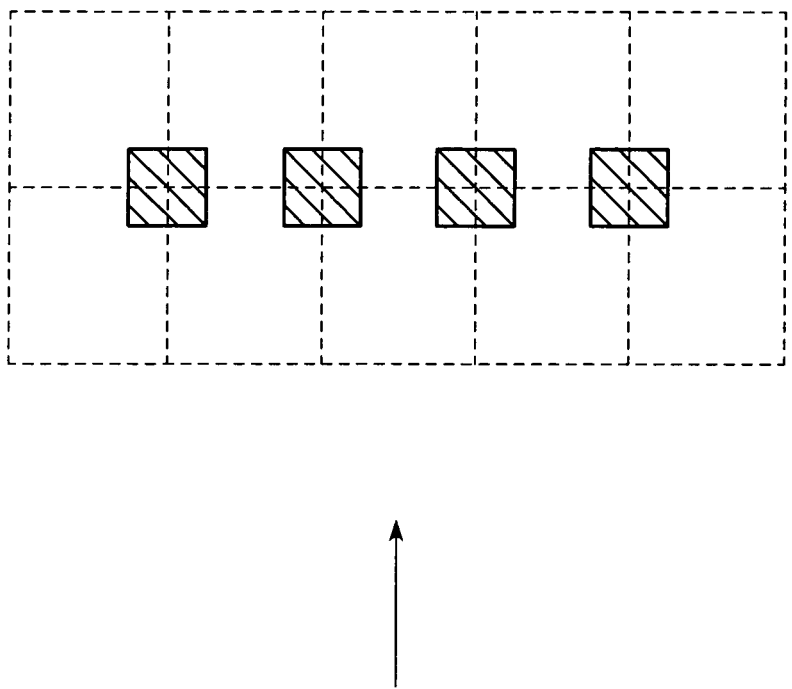
FIG. 14B is a block diagram that shows the mapping of the shaded data from FIG. 14A into the scratch buffer according to an embodiment.
Figure 14A:
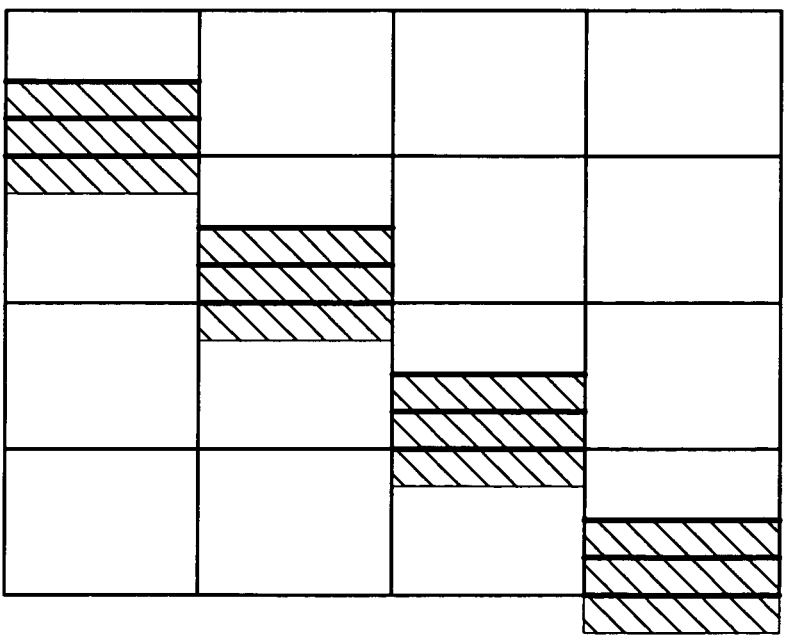
FIG. 14A is a block diagram that shows multiple macro blocks and their edges according to an embodiment.

FIG. 14A is a block diagram that shows multiple macro blocks and their edges. Each of the macro blocks is similar to the single macro block shown in FIG. 13A. FIG. 14A shows the data involved in a single vertical deblocking pass according to an embodiment. FIG. 14B is a block diagram that shows the mapping of the shaded data from FIG. 14A into the scratch buffer in an arrangement that optimally uses the available hardware.

Figure 15B:
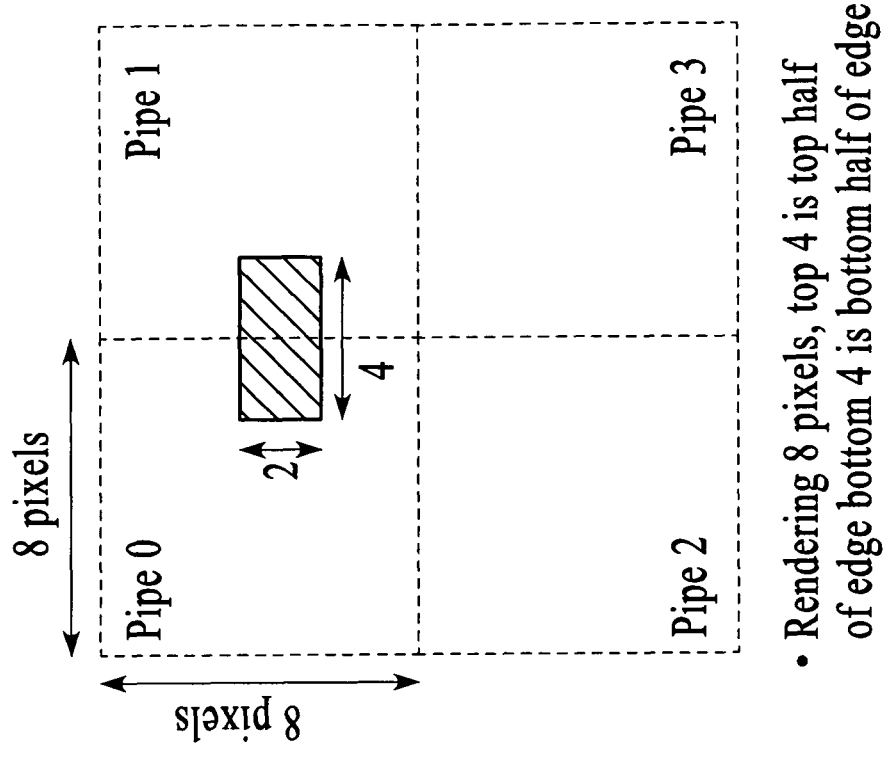
FIG. 15B is a block diagram that shows the conceptual mapping of the shaded data from FIG. 15A into the scratch buffer according to an embodiment.
Figure 15A:
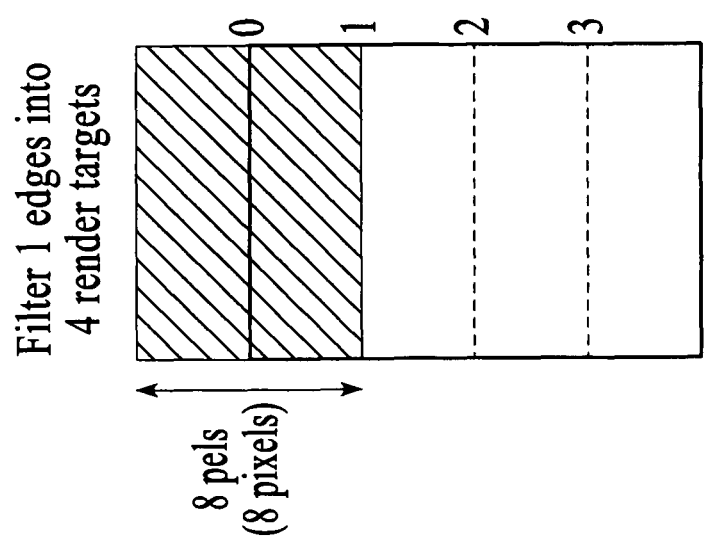
FIG. 15A is a block diagram of a macro block that shows horizontal edges 0-3 according to an embodiment.

FIG. 15A is a block diagram of a macro block that shows horizontal edges 0-3. The shaded area represents data involved in a deblocking operation for edge 0, including data (at the top) from a previous macro block. FIG. 15B is a block diagram that shows the conceptual mapping of the shaded data from FIG. 15A into the scratch buffer in an arrangement that optimally uses available pipelines in the example architecture that has been previously described herein.

Figures 16A, 16B:
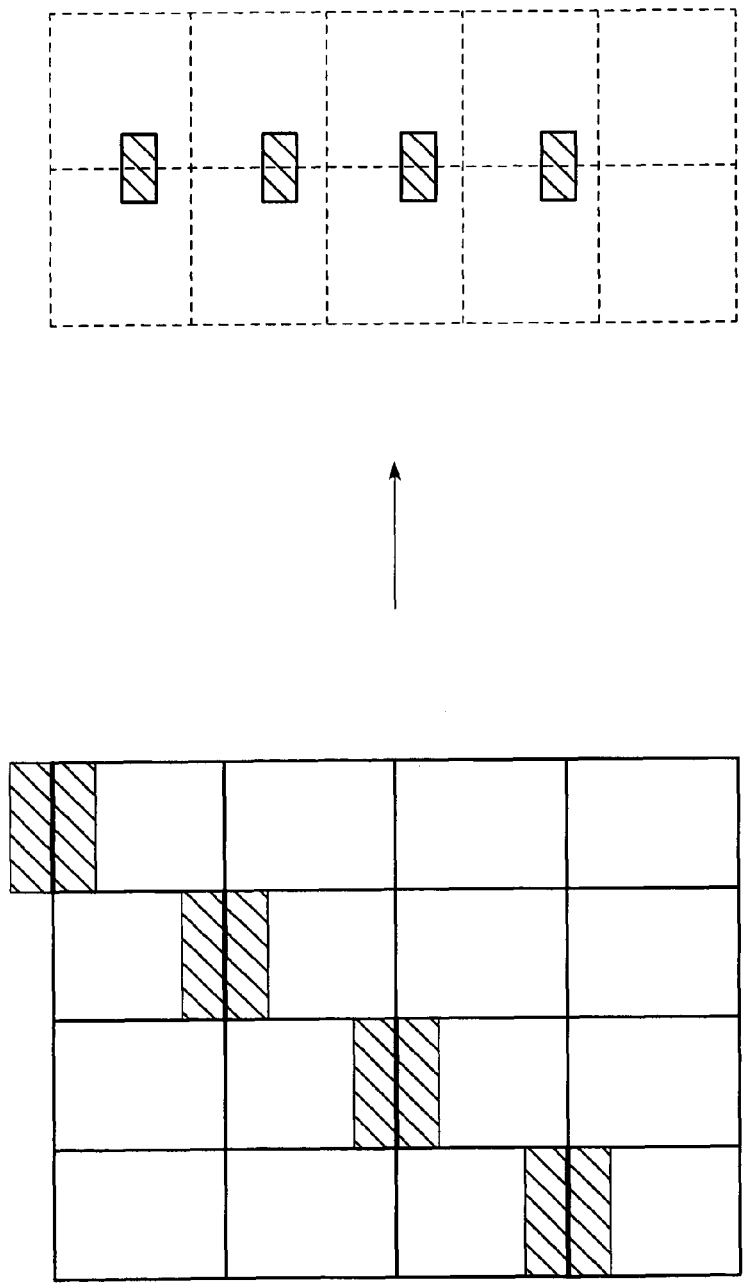
FIG. 16A is a bock diagram that shows multiple macro blocks and their edges according to an embodiment.
FIG. 16B is a block diagram that shows the mapping of the shaded data from FIG. 16A into the scratch buffer according to an embodiment.

FIG. 16A is a bock diagram that shows multiple macro blocks and their edges. Each macro block is similar to the single macro block shown in FIG. 15A. The shaded data is the data involved in deblocking for edges 0. FIG. 16B is a block diagram that shows the mapping of the shaded data from FIG. 16A into the scratch buffer in an arrangement that optimally uses the available hardware for performing deblocking on edges 0.

Figure 17B:
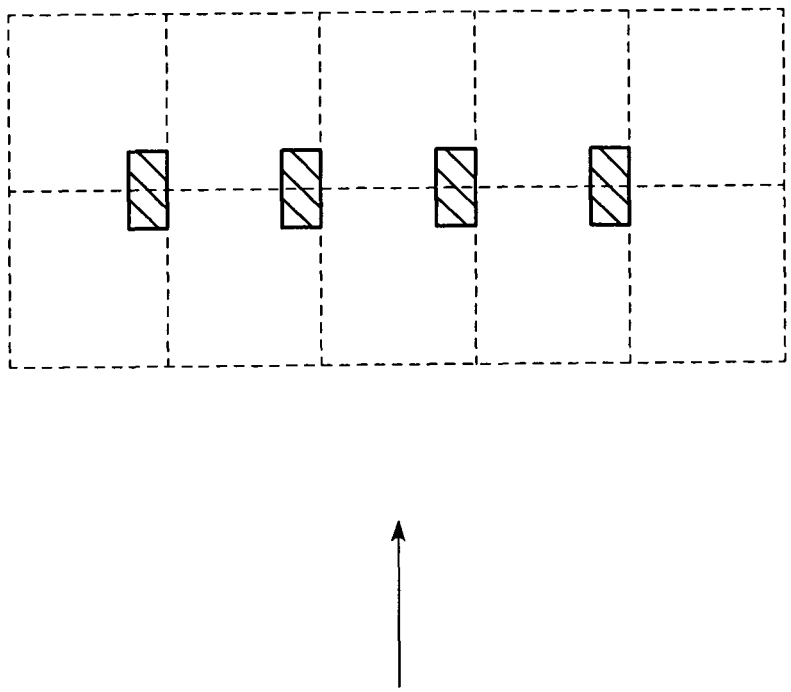
FIG. 17B is a block diagram that shows the mapping of the shaded data from FIG. 17A into the scratch buffer according to an embodiment.
Figure 17A:
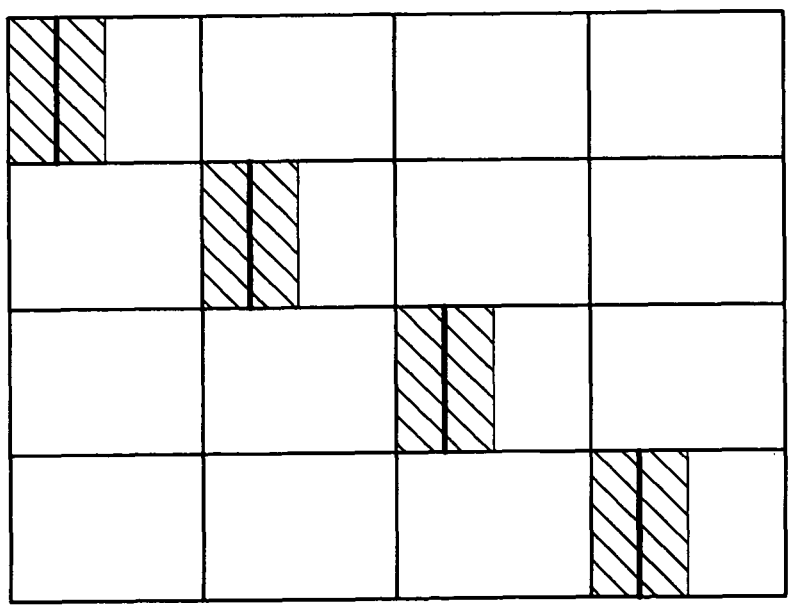
FIG. 17A is a bock diagram that shows multiple macro blocks and their edges according to an embodiment.

FIG. 17A is a bock diagram that shows multiple macro blocks and their edges. The shaded data is the data involved in deblocking for edges 1. FIG. 17B is a block diagram that shows the mapping of the shaded data from FIG. 17A into the scratch buffer in an arrangement that optimally uses the available hardware for performing deblocking on edges 1.

Figure 18B:
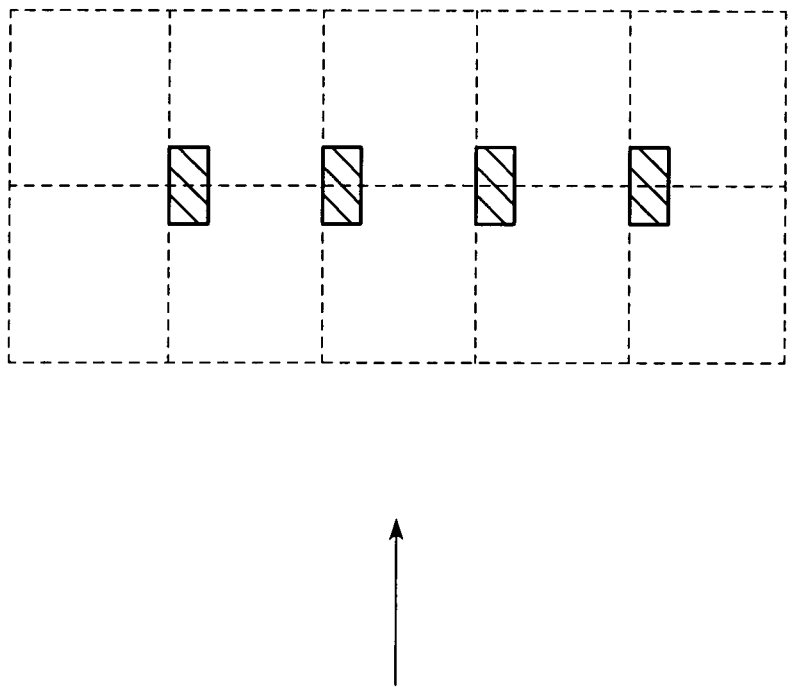
FIG. 18B is a block diagram that shows the mapping of the shaded data from FIG. 18A into the scratch buffer according to an embodiment.
Figure 18A:
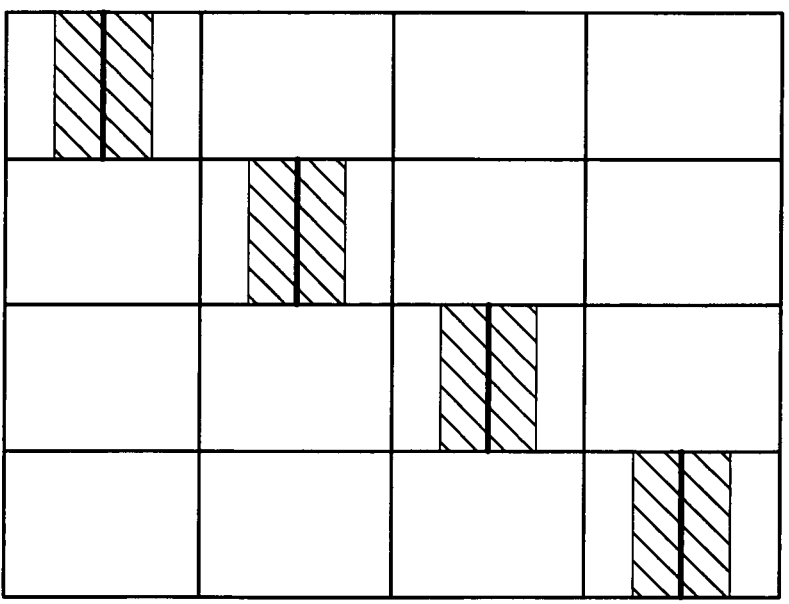
FIG. 18A is a bock diagram that shows multiple macro blocks and their edges according to an embodiment.

FIG. 18A is a bock diagram that shows multiple macro blocks and their edges. The shaded data is the data involved in deblocking for edges 2. FIG. 18B is a block diagram that shows the mapping of the shaded data from FIG. 18A into the scratch buffer in an arrangement that optimally uses the available hardware for performing deblocking on edges 2.

Figure 19B:
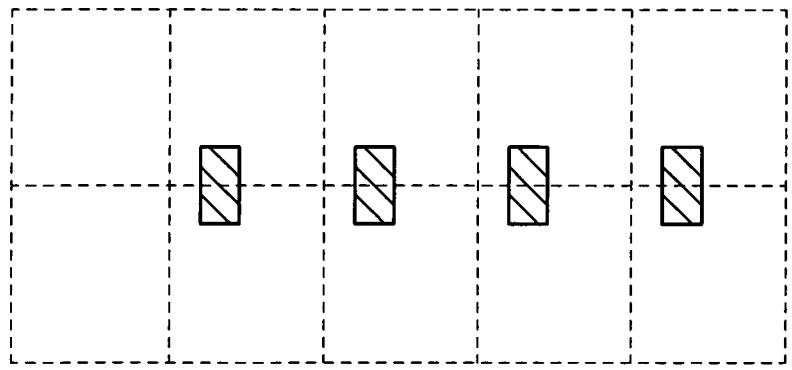
FIG. 19B is a block diagram that shows the mapping of the shaded data from FIG. 19A into the scratch buffer according to an embodiment.
Figure 19A:
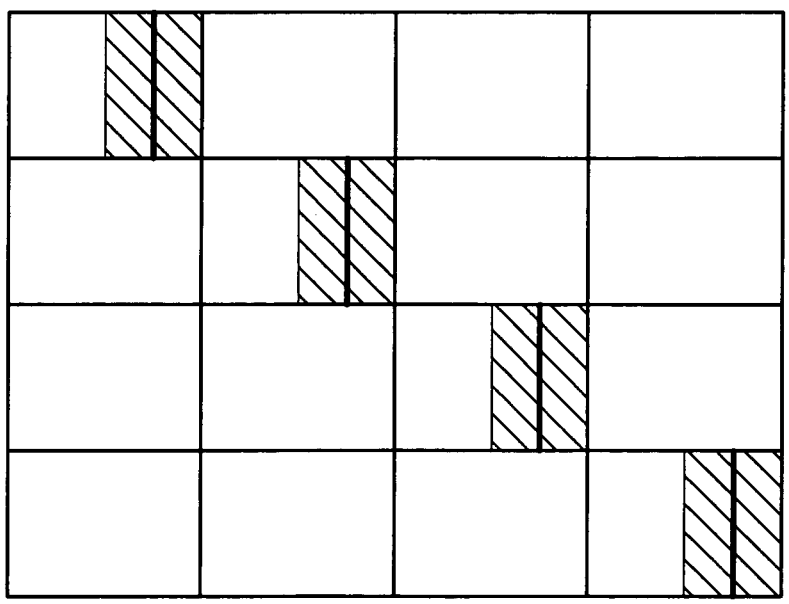
FIG. 19A is a bock diagram that shows multiple macro blocks and their edges according to an embodiment.

FIG. 19A is a bock diagram that shows multiple macro blocks and their edges. The shaded data is the data involved in deblocking for edges 3. FIG. 19B is a block diagram that shows the mapping of the shaded data from FIG. 19A into the scratch buffer in an arrangement that optimally uses the available hardware for performing deblocking on edges 3.

The mapping shown in FIGS. 13-19 is just one example of a mapping scheme for rearranging the pel data to be processed in a manner that optimizes the use of the available hardware.

Other variations on the methods and apparatus as described are also within the scope of the invention as claimed. For example, a scratch buffer could also be used in the inter-prediction and/or intra-prediction operations. Depending upon various factors, including the architecture of the graphics processing unit, using a scratch buffer may or may not be more efficient than processing "in place". In the embodiments described, which refer a particular architecture for the purpose of providing a coherent explanation, the deblocking operation benefits from using the scratch buffer. One reason is that the size and configuration of the pel data to be processed and the number of processing passes required do not vary. In addition, the order of the copies can vary. For example, copying can be done after every diagonal or after all of the diagonals. Therefore, the rearrangement for a particular architecture does not vary, and any performance penalties related to copying to the scratch buffer and copying back to the frame can be calculated. These performance penalties can be compared to the performance penalties associated with processing the pel data in place, but in configurations that are not optimized for the hardware. An informed choice can then be made regarding whether to use the scratch buffer or not. On the other hand, for intra-prediction for example, the units of data to be processed are randomized by the encoding process, so it is not possible to accurately predict gains or losses associated with using the scratch buffer, and the overall performance over time may be about the same as for processing in place.

In another embodiment, the deblocking filtering is performed by a vertex shader for an entire macro block. In this regard the vertex shader works as a dedicated hardware pipeline. In various embodiments with different numbers of available pipelines, there may be four, eight or more available pipelines. In an embodiment, the deblocking algorithm involves two passes. The first pass is a vertical pass for all macro blocks along the diagonal being filtered (or deblocked). The second pass is a horizontal pass along the same diagonal.

The vertex shader process 256 pels of the luma macro block and 64 pels of each chroma macro block. In an embodiment, the vertex shader passes resulting filtered pels to pixel shaders through 16 parameter registers. Each register (128 bits) keeps one 4×4 filtered block of data. The "virtual pixel", or the pixel visible to the scan converter is an 8×8 block of pels for most of the passes. In an embodiment, eight render targets are defined. Each render target has a pixel format with two channels, and 32 bits per channel.

The pixel shader is invoked per 8×8 block. The pixel shader selects four proper registers from the 16 provided, rearranges them into eight 2×32-bit output color registers, and sends the data to the color buffer. In an embodiment, two buffers are used, a source buffer, and a target buffer. For this discussion, the target buffer is the scratch buffer. The source buffer is used as texture and the target is comprised of either four or eight render targets. The following tables illustrate buffer states during deblocking.

Figure 20:
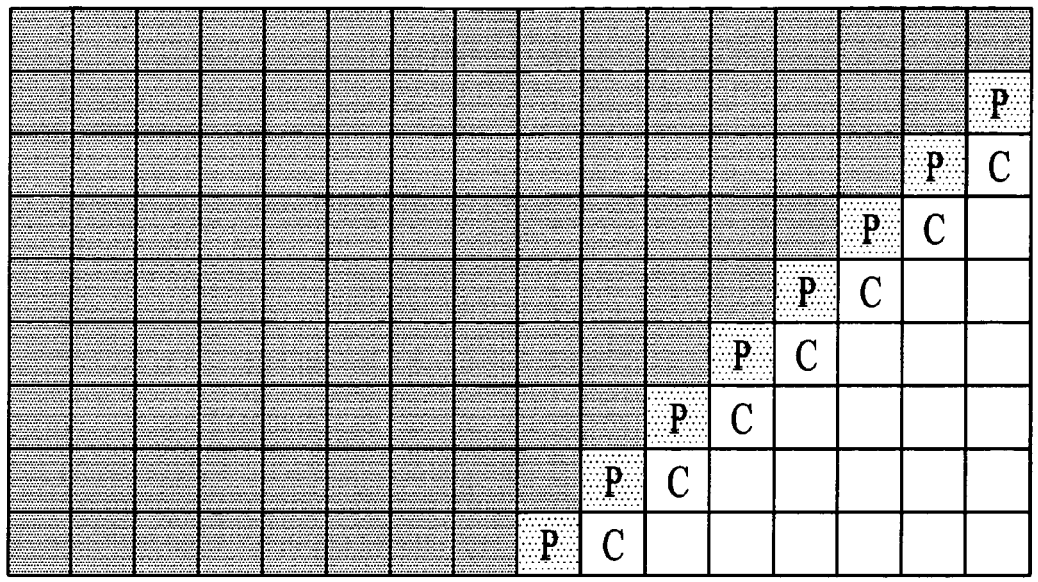
FIG. 20 is a block diagram of a source buffer at the beginning of a deblocking algorithm iteration according to an embodiment.
Figure 21:
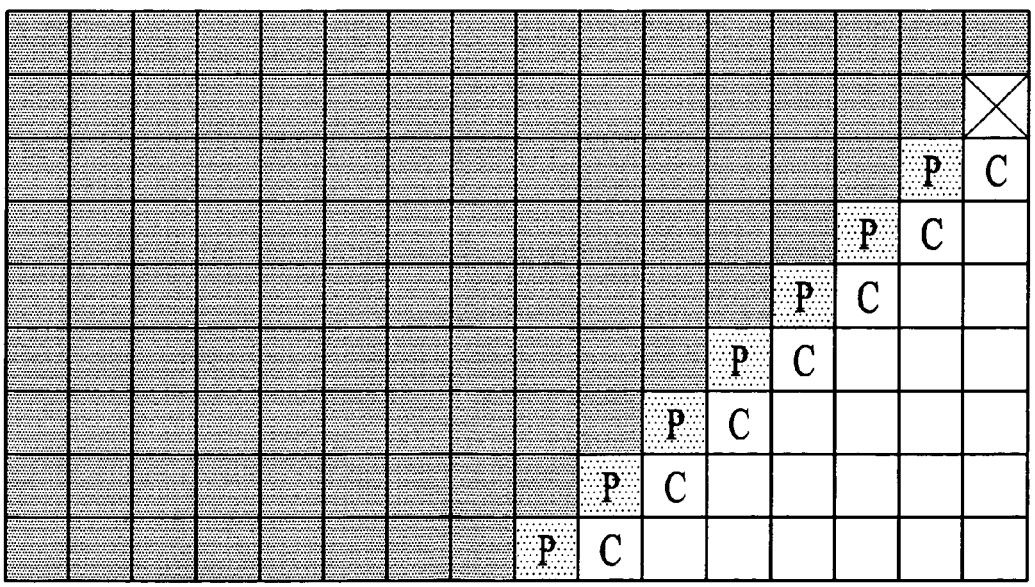
FIG. 21 is a block diagram of a target buffer at the beginning of a deblocking algorithm iteration according to an embodiment.

FIGS. 20 and 21 show the state of the source buffer (FIG. 20) and the target buffer (FIG. 21) at the beginning of an algorithm iteration designated by the letter C. "C" marks the diagonal of the macro blocks to be filtered at the iteration C. "P" marks the previous diagonal. Both source buffer and target buffer keep the same data. Darkly shaded cells indicate already filtered macro blocks, white cells indicate not-yet-filtered macro blocks. Lightly shaded cells are partially filtered in the previous iteration. The iteration C consists of several passes.

Pass1: Filtering the Left Side of the $0^{th}$ Vertical Edge of Each C Macro Block.

Figure 22:
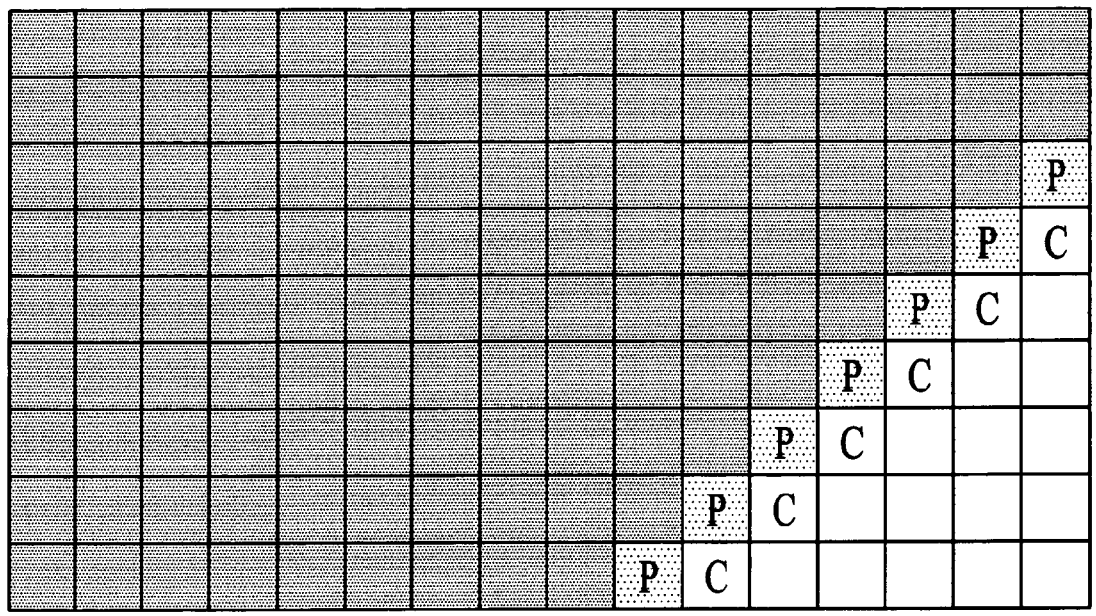
FIG. 22 is a block diagram of the target buffer after the left side filtering according to an embodiment.

This pass is running along the P diagonal. Since the cell with an "X" in FIG. 21 has no right neighbor, it is not a left neighbor itself and thus it is not taking part in this pass. A peculiarity of this pass is that the pixel shader is invoked per 4×4 block and not per 8×8 block as in "standard" mode. 16 parameter registers are still sent to the pixel shader, but they are unpacked 32 bit float values. The target in this case has an ARGB type pixel format. There are 4 render targets. FIG. 22 shows the state of the target buffer after the left side filtering.

Pass2: Filtering Vertical Edges of Each C Macro Block.

Figure 23:
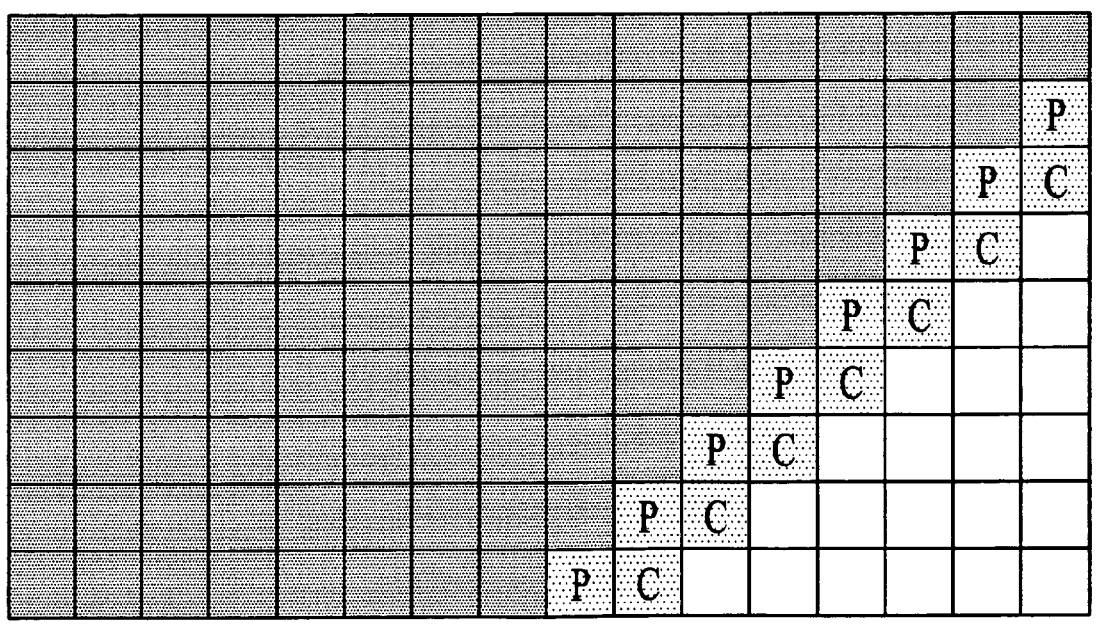
FIG. 23 is a block diagram of the target buffer after the vertical filtering according to an embodiment.

This pass is running along the C diagonal. During this pass the vertex/pixel shader pair is in a standard mode of operation. That is, the vertex shader sends 16 registers keeping a packed block of 4×4 pels each, and the pixel shader is invoked per 8×8 block, target pixel format (2 channel, 32 bit per channel). There are 8 render targets. FIG. 23 shows the state of the target after the vertical filtering. After pass2 the source and target are switched.

Pass3: Copying the State of the P Diagonal Only from the New Source (Old Target) to the New Target (Old Source).

Figure 24:
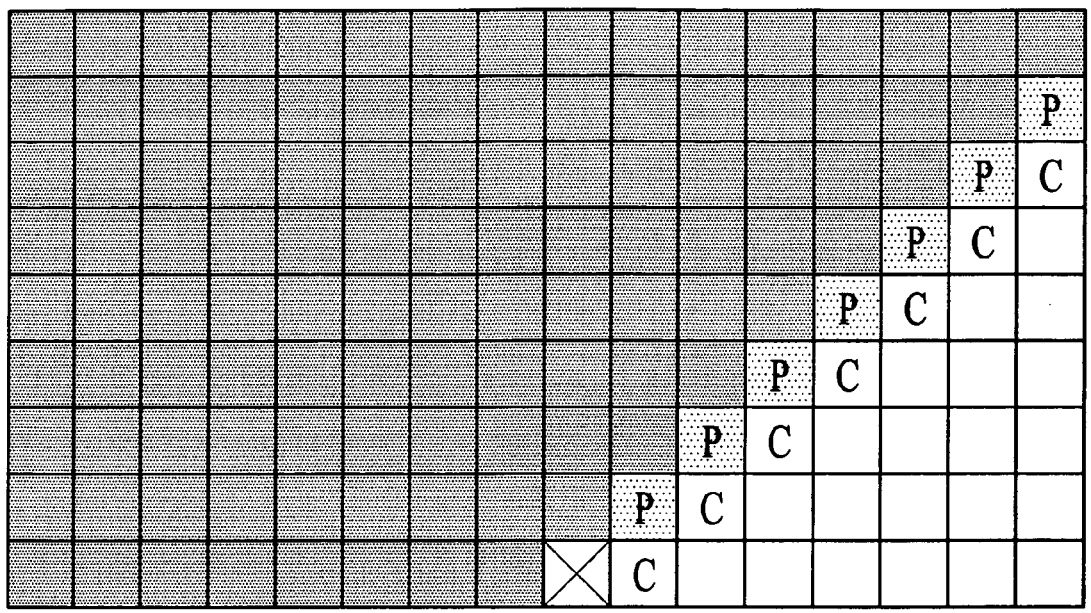
FIG. 24 is a block diagram of a new target buffer after a copy according to an embodiment.

FIG. 23 is a new source now. FIG. 24 presents the state of the new target after the copy. In this pass the vertex shader does nothing. The pixel shader copies texture pixels in standard mode (format: 2 channels, 32 per channel, virtual pixel is 8×8) directly into the frame buffer. 8 render targets are involved.

Pass4: Filtering the Up Side of the $0^{th}$ Horizontal Edge of Each C Macro Block.

Figure 25:
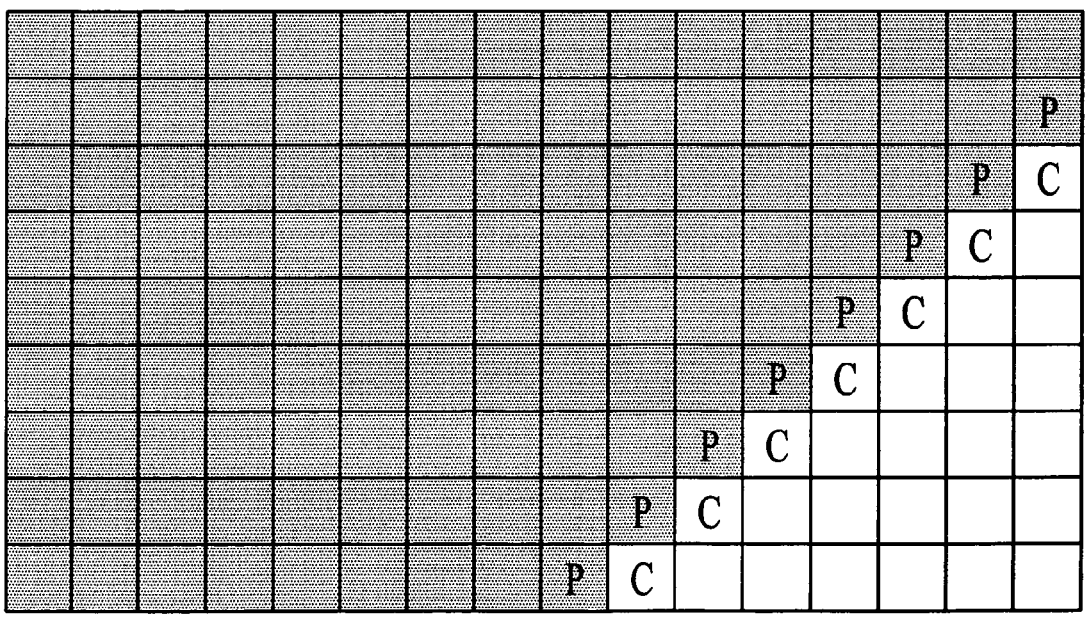
FIG. 25 is a block diagram of the target buffer after a pass according to an embodiment.

This pass is running along the P diagonal. Since the cell with an "X" in FIG. 24 has no down neighbor it is not an up neighbor itself and thus it is not taking part in the pass. FIG. 25 represents the target state after the pass. It shows that the P diagonal is fully filtered inside the target frame buffer. The vertex/pixel shader pair works in the same mode as in pass1.

Pass5: Filtering Horizontal Edges of Each C Macro Block.

Figure 26:
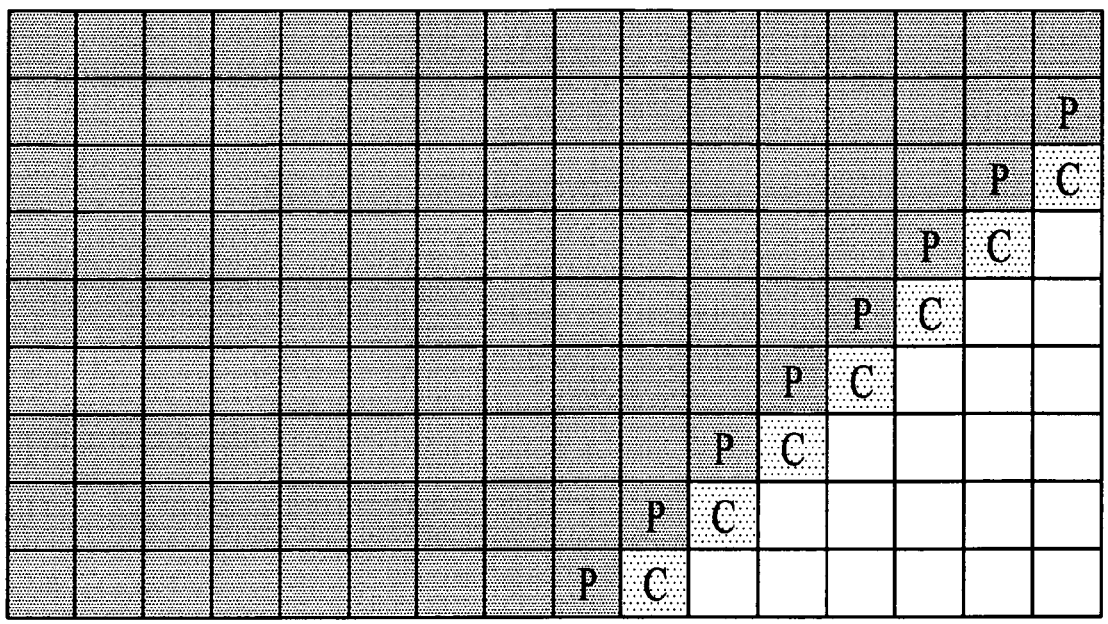
FIG. 26 is a block diagram of the target buffer after a pass according to an embodiment.

This pass is running along the C diagonal. The resulting target is shown in FIG. 26. Notice that, since the horizontal filter has been applied to the vertically filtered pels from the source (FIG. 23), the target C cells are now both vertically and horizontally filtered.

After pass2 the source and target are switched.

Pass6: Copying the State of the P and C Diagonals from the New Source (Old Target) to the New Target (Old Source).

Figure 27:
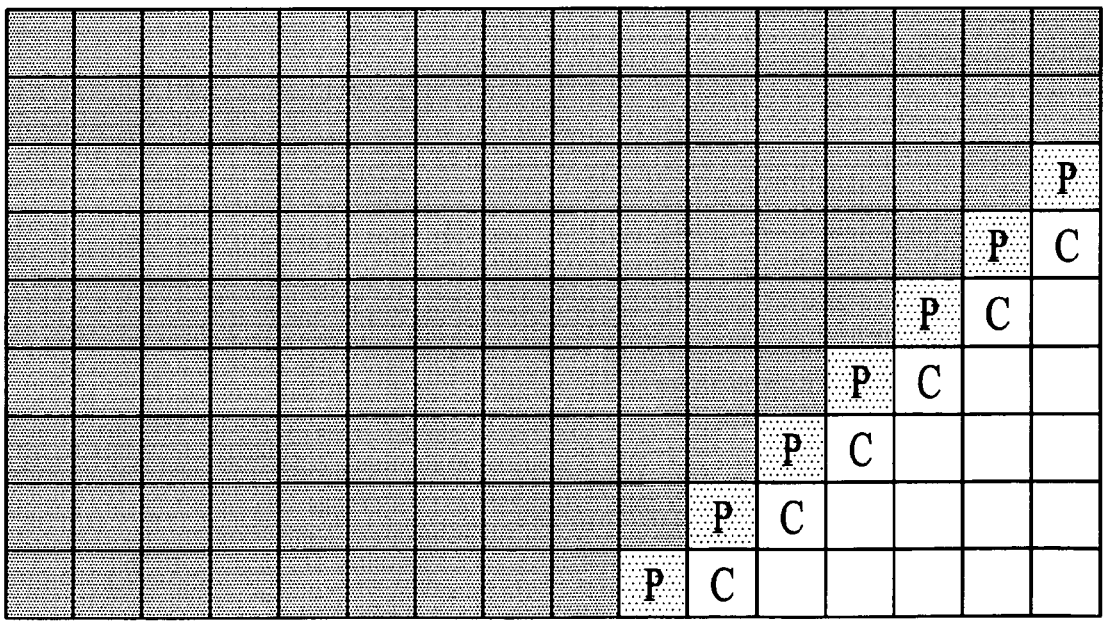
FIG. 27 is a block diagram of the target buffer after a copy according to an embodiment.

FIG. 26 is a now source. FIG. 23 is a new target. FIG. 27 is the state of the target after copy. The copying is done the same way as described with reference to Pass3.

After making P=C, and C=C+1, the algorithm is ready for the next iteration.

Aspects of the embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices, and standard cell-based devices, as well as application specific integrated circuits (ASICs) and fully custom integrated circuits. Some other possibilities for implementing aspects of the embodiments include microcontrollers with memory (such as electronically erasable programmable read only memory (EEPROM)), embedded microprocessors, firmware, software, etc. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word, any of the items in the list, all of the items in the list, and any combination of the items in the list.

The above description of illustrated embodiments of the method and system is not intended to be exhaustive or to limit the invention to the precise forms disclosed. While specific embodiments of, and examples for, the method and system are described herein for illustrative purposes, various equivalent modifications are possible within the scope of the invention, as those skilled in the relevant art will recognize. The teachings of the disclosure provided herein can be applied to other systems, not only for systems including graphics processing or video processing, as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a handheld device, a mobile telephone or some other device. The elements and acts of the various embodiments described above can be combined to provide further embodiments. These and other changes can be made to the method and system in light of the above detailed description.

In general, in the following claims, the terms used should not be construed to limit the method and system to the specific embodiments disclosed in the specification and the claims, but should be construed to include any processing systems and methods that operate under the claims. Accordingly, the method and system is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the method and system may be recited as embodied in computer-readable medium, other aspects may likewise be embodied in computer-readable medium. Accordingly, the inventors reserve the right to add additional claims after filing the application to pursue such additional claim forms for other aspects of the method and system.

What is claimed is:

1. A video data decoding method comprising:
   pre-processing control maps generated from encoded video data that was encoded according to a pre-defined format, wherein pre-processing comprises generating a plurality of intermediate control maps for a respective plurality of frame processing operations containing control information, the control information including an indication of which macro blocks or portions of macro blocks of a frame may be processed in parallel in respective frame processing operations; and
   decoding the encoded video data on a frame basis using an interprediction algorithm, intraprediction algorithm or both interprediction and intraprediction algorithms, wherein decoding comprises parallel processing of macro blocks or portions of macro blocks in respective frame processing operations using the intermediate control maps to improve the performance of a plurality of processing pipelines whereby one intermediate control map can control frame processing for an interprediction algorithm where one set of macro blocks of a frame are identified for parallel processing and another intermediate control map can control frame processing for an intraprediction algorithm where an entirely different set of macro blocks of the frame are identified for parallel processing, wherein the plurality of intermediate control maps and at least one buffer are generated by running a pre-shader on the control maps based on at least one predetermined value that is set to indicate whether particular macro blocks are interprediction, intraprediction or both interprediction and intraprediction, the at least on buffer containing a subset of control information indicating which of the macro blocks are interprediction, intraprediction or both interprediction and intraprediction.

2. The method of claim 1, wherein the control information comprises control information specific to an architecture of a graphics processing unit (GPU).

3. The method of claim 1, wherein the plurality of processing pipelines comprise a plurality of graphics processing unit (GPU) pipelines.

4. The method of claim 1, wherein the pre-defined format comprises a compression scheme according to which the video data may be encoded using one of a plurality of prediction operations for various units of data in a frame, and wherein the control information comprises an indication of which prediction operation was used to encode each unit of data in the frame.

5. The method of claim 4, wherein the compression scheme comprises one of a plurality of high-compression-ratio schemes, including H.264.

6. The method of claim 4, wherein the pre-defined format comprises an MPEG standard video format.

7. The method of claim 1, further comprising decoding the encoded video data on a frame basis such that each one of several decoding operations is performed on an entire frame of video data at a time.

8. The method of claim 1, wherein the control information comprises a rearrangement of the video data such that a decoding operation can be performed in parallel on multiple video data using the plurality of GPU pipelines.

9. The method of claim 1, wherein the buffer is a Z-buffer.

10. The method of claim 1, wherein the frame processing operations include respective uses of both the interprediction and intraprediction algorithms such that the use of the interprediction algorithm decoding precedes the use of the intraprediction algorithm.

11. The method of claim 1, wherein at least one intermediate control map comprises a map identifying blocks that are interprediction blocks and intraprediction blocks.

12. A system for decoding video data encoded using a high-compression-ratio codec, the system comprising:
a processing unit, comprising, a plurality of processing pipelines; and
a driver comprising a layered decoder, wherein the layered decoder pre-processes control maps generated from encoded video data that was encoded according to a pre-defined format on a frame basis using an interprediction algorithm, intraprediction algorithm or both interprediction and intraprediction algorithms, wherein pre-processing comprises generating a plurality of intermediate control maps containing control information for a respective plurality of frame processing operations, including control information specific to the plurality of processing pipelines and including an indication of which macro blocks or portions of macro blocks may be processed in parallel in the respective frame processing operation whereby one intermediate control map can control frame processing for an interprediction algorithm where one set of macro blocks of a frame are identified for parallel processing and another intermediate control map can control frame processing for an intraprediction algorithm where an entirely different set of macro blocks of the frame are identified for parallel processing, wherein the plurality of intermediate control maps and at least one buffer are generated by running a pre-shader on the control maps based on at least one predetermined value that is set to indicate whether particular macro blocks are interprediction, intraprediction or both interprediction and intraprediction, the at least on buffer containing a subset of control information indicating which of the macro blocks are interprediction, intraprediction or both interprediction and intraprediction.

13. The system of claim 12, wherein the at least one buffer is a Z-buffer coupled to the driver, wherein generating the intermediate control maps comprises performing Z-testing on the Z-buffer.

14. The system of claim 13, wherein the control information comprises information regarding rearranging the video data and directing the processing of the video data to be performed in parallel on the plurality of processing pipelines.

15. The system of claim 14, further comprising a scratch buffer coupled to the driver, wherein the scratch buffer stores rearranged data for processing.

16. A method for decoding video data encoded using a high-compression-ratio codec, the method comprising:
pre-processing control maps that were generated during encoding of the video data; and
generating a plurality of intermediate control maps for a respective plurality of frame processing operations comprising information including an indication of which macro blocks or portions of macro blocks may be processed in parallel in respective frame processing operations, the information also including information regarding decoding the video data on a frame basis using an interprediction algorithm and intraprediction algorithm in respective frame processing operations, and further regarding rearranging the video data to be processed in parallel on multiple pipelines of a graphics processing unit (GPU) so as to improve usage of the multiple pipelines whereby one intermediate control map can control frame processing for an interprediction algorithm where one set of macro blocks of a frame are identified for parallel processing and another intermediate control map can control frame processing for an intraprediction algorithm where an entirely different set of macro blocks of a frame are identified for parallel processing, wherein the plurality of intermediate control maps and at least one buffer are generated by running a pre-shader on the control maps based on at least one predetermined value that is set to indicate whether particular macro blocks are interprediction, intraprediction or both interprediction and intraprediction, the at least on buffer containing a subset of control information indicating which of the macro blocks are interprediction, intraprediction or both interprediction and intraprediction.

17. The method of claim 16, further comprising executing a plurality of setup passes on the control maps, comprising performing Z-testing of the at least one buffer, wherein the at least one buffer is a Z-buffer.

18. The method of 17, further comprising: determining from the intermediate control maps which data units within a frame are inter-prediction video data units; and performing inter-prediction on all of the inter-prediction data units within the frame.

19. The method of 17, further comprising: determining from the intermediate control maps which data units within a frame are intra-prediction video data units; and performing intra-prediction on all of the intra-prediction video data units within the frame.

20. The method of claim 19, further comprising: determining from the intermediate control maps video data units that do not have inter-unit dependencies for deblocking filtering; and rearranging the video data units that do not have inter-unit dependencies such that the data units that do not have inter-unit dependencies can be processed in parallel on the multiple pipelines.

21. The method of claim 20, further comprising mapping the rearranged data units that do not have inter-unit dependencies to a scratch buffer for processing.

22. A non-transitory computer readable medium including instructions which when executed in a video processing system cause the system to process the encoded video data, the processing comprising:
pre-processing control maps generated from encoded video data that was encoded according to a pre-defined format, wherein pre-processing comprises generating a plurality of intermediate control maps for a respective plurality of frame processing operations containing control information, including control information specific to an architecture of a video processing unit, and including an indication of which macro blocks or portions of macro blocks may be processed in parallel in respective frame processing operations; and
decoding the encoded video data on a frame basis using an interprediction algorithm and an intraprediction algorithm, wherein decoding comprises parallel processing in respective frame processing operations using the intermediate control maps to improve the performance of a plurality of graphics processing unit (GPU) pipelines whereby one intermediate control map can control frame processing for an interprediction algorithm where one set of macro blocks of a frame are identified for parallel processing and another intermediate control map can control frame processing for an intraprediction algorithm where an entirely different set of macro blocks of a frame are identified for parallel processing, wherein the plurality of intermediate control maps and at least one buffer are generated by running a pre-shader on the control maps based on at least one predetermined value that is set to indicate whether particular macro blocks are interprediction, intraprediction or both interprediction and intraprediction, the at least on buffer containing a subset of control information indicating which of the macro blocks are interprediction, intraprediction or both interprediction and intraprediction.

23. The computer readable medium of claim 22, wherein the pre-defined format comprises a compression scheme according to which the video data may be encoded using one of a plurality of prediction operations for various units of data in a frame, and wherein the control information comprises an indication of which prediction operation was used to encode each unit of data in the frame.

24. The computer readable medium of claim 23, wherein the compression scheme comprises one of a plurality of high-compression-ratio schemes, including H.264.

25. The computer readable medium of claim 23, wherein the pre-defined format comprises an MPEG standard video format.

26. The computer readable medium of claim 23, wherein the interprediction algorithm decoding precedes the intraprediction algorithm decoding.

27. The computer readable medium of claim 22, wherein the processing further comprises decoding the encoded video data such that each one of several decoding operations is performed on an entire frame of video data at a time.

28. The computer readable medium of claim 22, wherein the control information comprises a rearrangement of the video data such that a decoding operation can be performed in parallel on multiple video data using the plurality of GPU pipelines.

29. The computer readable medium of claim 22, wherein the pre-shader is one of a plurality of pre-shaders.

30. The computer readable medium of claim 22, wherein the processing further comprises decoding the encoded video data such that each one of several decoding operations is performed on an entire frame of video data at a time.

31. A non-transitory computer readable medium having instructions stored thereon which, when processed, are adapted to create a circuit capable of performing a method comprising:
pre-processing control maps generated from encoded video data that was encoded according to a pre-defined format, wherein pre-processing comprises generating a plurality of intermediate control maps containing control information for a respective plurality of frame processing operations, including control information specific to an architecture of a video processing unit and including an indication of which macro blocks or portions of macro blocks may be processed in parallel in respective frame processing operations; and
decoding the encoded video data on a frame basis using an interprediction algorithm, intraprediction algorithm or both interprediction and intraprediction algorithms, wherein decoding comprises parallel processing in respective frame processing operations using the intermediate control maps to improve the performance of a plurality of graphics processing unit (GPU) pipelines whereby one intermediate control map can control frame processing for an interprediction algorithm where one set of macro blocks of a frame are identified for parallel processing and another intermediate control map can control frame processing for an intraprediction algorithm where an entirely different set of macro blocks of a frame are identified for parallel processing, wherein the plurality of intermediate control maps and at least one buffer are generated by running a pre-shader on the control maps based on at least one predetermined value that is set to indicate whether particular macro blocks are interprediction, intraprediction or both interprediction and intraprediction, the at least on buffer containing a subset of control information indicating which of the macro blocks are interprediction, intraprediction or both interprediction and intraprediction.

* * * * *